US009753889B2

(12) United States Patent
Sperber et al.

(10) Patent No.: US 9,753,889 B2
(45) Date of Patent: Sep. 5, 2017

(54) GATHER USING INDEX ARRAY AND FINITE STATE MACHINE

(71) Applicant: Intel Corporation, Santa Clara, CA (US)

(72) Inventors: Zeev Sperber, Zichron Yaakov (IL); Robert Valentine, Qiryat Tivon (IL); Guy Patkin, Biet-Yanay (IL); Stanislav Shwartsman, Haifa (IL); Shlomo Raikin, Geva Carmel (IL); Igor Yanover, Yokneam Illit (IL); Gal Ofir, Atzmon (IL)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/881,111

(22) Filed: Oct. 12, 2015

(65) Prior Publication Data

US 2016/0103785 A1    Apr. 14, 2016

Related U.S. Application Data

(63) Continuation of application No. 14/616,323, filed on Feb. 6, 2015, now abandoned, which is a continuation
(Continued)

(51) Int. Cl.
*G06F 12/02*    (2006.01)
*G06F 15/80*    (2006.01)
(Continued)

(52) U.S. Cl.
CPC ...... *G06F 15/8007* (2013.01); *G06F 9/30018* (2013.01); *G06F 9/30036* (2013.01);
(Continued)

(58) Field of Classification Search
CPC ............ G06F 15/8007; G06F 9/30036; G06F 9/30043; G06F 9/30018; G06F 9/345; G06F 9/30145
See application file for complete search history.

(56) References Cited

U.S. PATENT DOCUMENTS 4,589,065 A    5/1986  Auslander et al.
4,961,161 A   10/1990  Kojima
(Continued)

FOREIGN PATENT DOCUMENTS

WO        2013180738 A1    12/2013

OTHER PUBLICATIONS

International Search Report and Written Opinion for PCT Application No. PCT/US20121040628, Korean Search Authority, Daejeon Metropolitan City, Republic of Korea, mailed on Jan. 29, 2013, 9 pages.
(Continued)

*Primary Examiner* — Hiep Nguyen
(74) *Attorney, Agent, or Firm* — Nicholson De Vos Webster & Elliott LLP

(57) ABSTRACT

Methods and apparatus are disclosed for using an index array and finite state machine for scatter/gather operations. Embodiment of apparatus may comprise: decode logic to decode a scatter/gather instruction and generate a set of micro-operations, and an index array to hold a set of indices and a corresponding set of mask elements. A finite state machine facilitates the gather operation. Address generation logic generates an address from an index of the set of indices for at least each of the corresponding mask elements having a first value. An address is accessed to load a corresponding data element if the mask element had the first value. The data element is written at an in-register position in a destination vector register according to a respective in-register position
(Continued)

the index. Values of corresponding mask elements are changed from the first value to a second value responsive to completion of their respective loads.

17 Claims, 19 Drawing Sheets

Related U.S. Application Data of application No. 13/487,184, filed on Jun. 2, 2012, now Pat. No. 8,972,697.

(51) Int. Cl.
*G06F 9/30* (2006.01)
*G06F 9/345* (2006.01)

(52) U.S. Cl.
CPC ...... *G06F 9/30043* (2013.01); *G06F 9/30145* (2013.01); *G06F 9/345* (2013.01)

(56) References Cited

U.S. PATENT DOCUMENTS

| | | | |
|---|---|---|---|
| 5,182,811 A | 1/1993 | Sakamura | |
| 5,504,925 A | 4/1996 | Jeffs | |
| 5,632,028 A | 5/1997 | Thusoo et al. | |
| 5,673,426 A | 9/1997 | Shen et al. | |
| 5,680,620 A | 10/1997 | Ross | |
| 5,745,770 A | 4/1998 | Thangadurai et al. | |
| 5,812,439 A | 9/1998 | Hansen | |
| 5,933,618 A | 8/1999 | Tran et al. | |
| 5,966,529 A | 10/1999 | Sollars | |
| 6,006,030 A | 12/1999 | Dockser | |
| 6,044,454 A | 3/2000 | Schwarz et al. | |
| 6,049,876 A | 4/2000 | Moughanni et al. | |
| 6,131,158 A | 10/2000 | Matsuo et al. | |
| 6,374,345 B1 | 4/2002 | Juffa et al. | |
| 6,408,379 B1 | 6/2002 | Juffa et al. | |
| 6,542,988 B1 | 4/2003 | Tremblay et al. | |
| 6,615,343 B1 | 9/2003 | Talcott et al. | |
| 6,665,746 B1 | 12/2003 | Liong | |
| 6,675,292 B2 | 1/2004 | Prabhu et al. | |
| 6,704,862 B1 | 3/2004 | Chaudhry et al. | |
| 6,742,113 B1 | 5/2004 | Yamada | |
| 6,795,937 B2 | 9/2004 | Harris et al. | |
| 7,210,027 B2 | 4/2007 | Suzuki et al. | |
| 7,216,218 B2 | 5/2007 | Wilson | |
| 7,502,277 B2 | 3/2009 | Wu et al. | |
| 7,707,393 B2 | 4/2010 | Wilson | |
| 7,882,339 B2 | 2/2011 | Jacobson et al. | |
| 7,966,480 B2 | 6/2011 | Catherwood | |
| 8,447,962 B2 | 5/2013 | Hughes et al. | |
| 8,972,697 B2 * | 3/2015 | Sperber | G06F 9/30036 711/220 |
| 2003/0074530 A1 | 4/2003 | Mahalingaiah et al. | |
| 2003/0131183 A1 | 7/2003 | Rappoport et al. | |
| 2004/0236920 A1 | 11/2004 | Sheaffer | |
| 2005/0188178 A1 | 8/2005 | Saida | |
| 2008/0235461 A1 | 9/2008 | Tan et al. | |
| 2009/0172364 A1 | 7/2009 | Sprangle et al. | |
| 2009/0300324 A1 | 12/2009 | Inuo | |
| 2010/0199067 A1 | 8/2010 | Mejdrich et al. | |
| 2011/0153983 A1 * | 6/2011 | Hughes | G06F 9/30018 712/22 |
| 2011/0264863 A1 * | 10/2011 | Sprangle | G06F 9/30043 711/125 |
| 2012/0144089 A1 * | 6/2012 | Hall | G06F 12/08 711/3 |
| 2013/0275729 A1 | 10/2013 | Abraham et al. | |
| 2015/0074373 A1 | 3/2015 | Sperber et al. | |

OTHER PUBLICATIONS

PCT/US2012/040628 Notification Concerning Transmittal of International Preliminary Report on Patentability, dated Dec. 11, 2014, 6 pages.
Final Office action from U.S. Appl. No. 13/977,727, dated May 9, 2016, 8 pages.
Office action from U.S. Appl. No. 13/977,727, dated Dec. 31, 2015, 8 pages.
Notice of Allowance from U.S. Appl. No. 13/977,727, dated Aug. 19, 2016, 7 pages.

* cited by examiner

GATHER USING INDEX ARRAY AND FINITE STATE MACHINE

RELATED APPLICATIONS

This is a Continuation of application Ser. No. 14/616,323, filed Feb. 2, 2015, which is a Continuation of application Ser. No. 13/487,184, filed Jun. 2, 2012, now U.S. Pat. No. 8,972,697.

FIELD OF THE DISCLOSURE

This disclosure relates generally to the fields of computing and/or communications. In particular, the disclosure relates to use of an index array and finite state machine responsive to, and/or in support of scatter/gather operations.

BACKGROUND OF THE DISCLOSURE

Modern processors often include instructions to provide operations that are computationally intensive, but offer a high level of data parallelism that can be exploited through an efficient implementation using various data storage devices, such as for example, single instruction multiple data (SIMD) vector registers.

For some applications, memory access may be complex, inconsistent, or noncontiguous, for example, for operations such as three dimensional (3D) image rendering. The memory being used by vectorized processes may not always be contiguous or in adjacent memory locations. A number of architectures may require extra instructions to order data in the registers before performing any arithmetic operations, which minimizes instruction throughput and significantly increase the number of clock cycles required.

Mechanisms for improving memory access and ordering data to and from wider vectors may include implementing gathering and scattering operations for generating local contiguous memory access for data from other non-local and/or noncontiguous memory locations. Gather operations may collect data from a set of noncontiguous or random memory locations in a storage device and combine the disparate data into a packed structure. Scatter operations may disperse elements in a packed structure to a set of noncontiguous or random memory locations.

Additionally some of these memory locations may not be cached, or may have been paged out of physical memory. If gather operations are interrupted for a page fault or some other reason, with some architectures, the state of the machine may not be saved, requiring a repeat of the entire gather operation rather than a restart where the gather operation was interrupted. Since multiple memory accesses may be required on any gather operation, many clock cycles may be required for completion, for which any subsequent dependent arithmetic operations must necessarily wait. Such delays represent a bottleneck, which may limit performance advantages otherwise expected, for example, from a wide or large width vector architecture.

Alternative mechanisms for improving memory access and ordering data to and from wider vectors may include causing parallel loads or stores of separated words to or from a data vector using different memory chips in a computer. Again, some of these memory locations may have been paged out of physical memory, and so the issues remain for restarting operations that are interrupted for a page fault or some other reason, but this time the loads or stores may be executing in parallel. Hence, resolving such faults in a correct order may be difficult or require serialization and all of the loads or stores may need to be completed prior to the resolving of such faults.

Some mechanisms may include implementing gathering and scattering using completion masks to track the completion of the individual loads and stores respectively, but the physical register storage for vector registers and completion masks may be closer to execution units with wide data paths for performing SIMD type arithmetic rather than, for example, address generation logic for accessing memory. In such cases, generating addresses for accessing non-local and/or noncontiguous memory locations from individual data elements in the vector registers and tracking the individual completion masks, could also reduce the benefits expected from performing a wide SIMD type gather or scatter operation.

To date, potential solutions to such performance limiting issues and bottlenecks have not been adequately explored.

BRIEF DESCRIPTION OF THE DRAWINGS

The present invention is illustrated by way of example and not limitation in the figures of the accompanying drawings.

DETAILED DESCRIPTION

Figure 1:
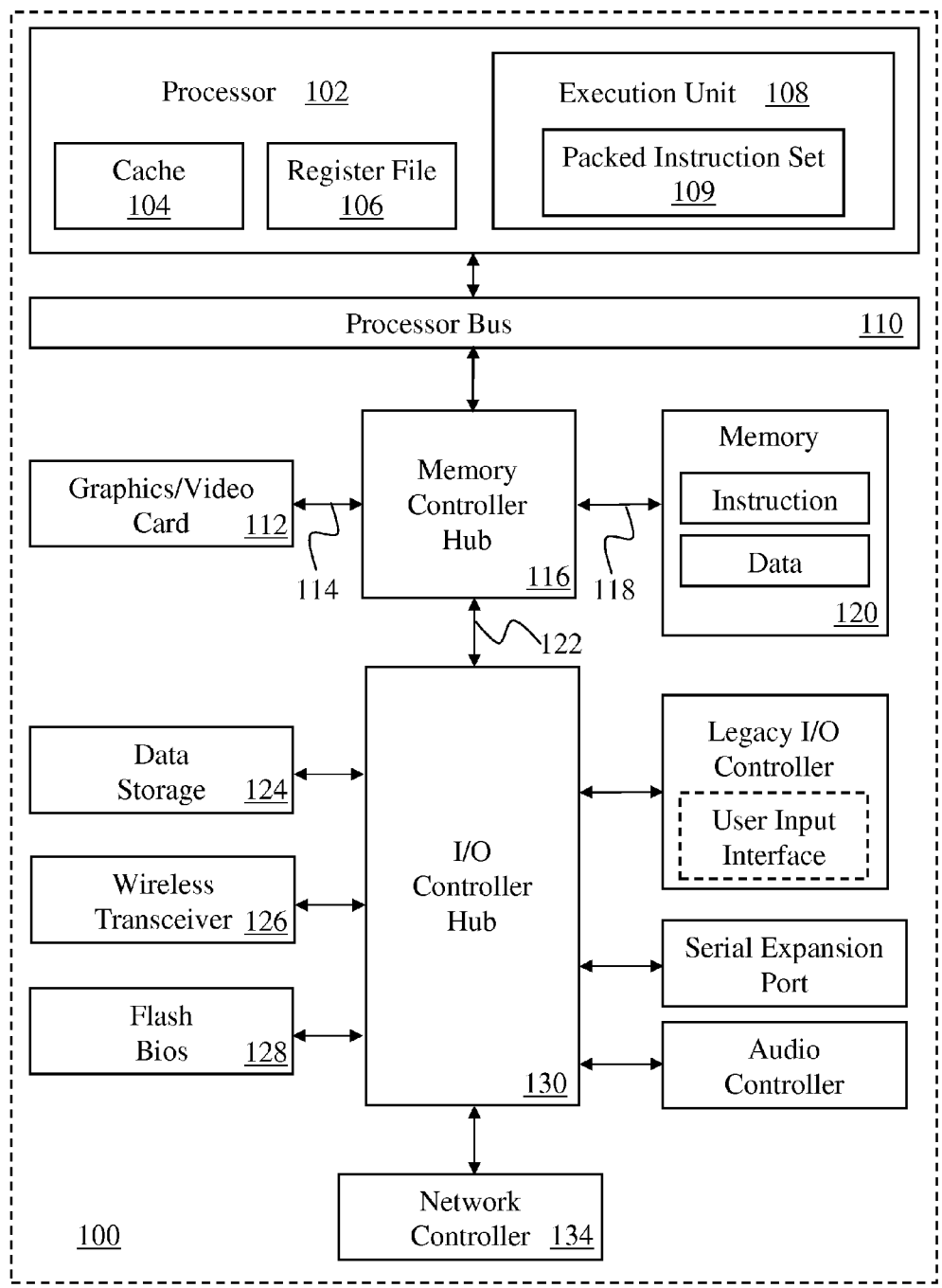
FIG. 1 illustrates one embodiment of a computing system for using an index array and finite state machine responsive to, and/or in support of scatter and/or gather operations.

Gather and scatter operations rearrange stored data elements for use by SIMD hardware. Gather operations read a set of data elements from memory and pack them together, typically into a single register or cache line. Scatter operations perform the reverse operation by dispersing data elements in a packed data structure to a set of non-contiguous or random memory locations. In addition to the delays associated with accessing one or more levels of memory, interruptions during the gather or scatter operations, e.g., due to repeated page faults, may significantly increase the overhead associated with these operations since any progress made by the operation is typically discarded prior to returning to the beginning of the operation. U.S. Pat. App. No. 2009/0172364, portions of which have been incorporated herein, discloses gather, scatter, and prefetch implementations which, when interrupted, may save the state of the operation. Thus, when the operation is restarted, a repeat of the entire operation may not be required.

Implementing gather and scatter operations using completion masks to track the completion of the individual loads and stores respectively may require generating addresses for accessing individual non-local and/or noncontiguous memory locations from individual data elements in the vector registers and tracking the individual completion mask elements upon their completion. But the physical register storage for vector registers and completion masks may be closer to execution units with wide data paths for performing SIMD type arithmetic rather than, for example, address generation logic for accessing the individual non-local and/or noncontiguous memory locations. In such cases, separately generating addresses for accessing individual memory locations, for example using multiple individual micro-operations (uops) for each of the individual data elements in the vector registers and for tracking the individual completion masks, may reduce the benefits expected from performing a wide SIMD type gather or scatter operation. Additionally, communication of the individual data elements in the vector registers and completion masks to the address generation logic, and to (or from) the memory access units is another technical problem, which needs to be addressed.

Novel methods and apparatus are disclosed herein using an index array and finite state machine for scatter and/or gather operations without requiring the scheduling of multiple individual micro-operations for generating addresses for each of the individual data elements in a vector register or for tracking the individual completion masks. Embodiments of an apparatus may comprise an index array to store a set of indices transferred from a SIMD vector register and a corresponding set of mask elements. A finite state machine (FSM) coupled with the index array may facilitate a scatter/gather operation using the set of indices and the corresponding mask elements through address generation logic, responsive to the FSM, to generate addresses from the indices in the index array at least for each corresponding unmasked element. A memory access unit, coupled with the address generation logic accesses the corresponding memory locations generated to store or load the corresponding data. Some embodiments may use the index array and address generation logic to generate addresses for each element separately. In some embodiments completion of a scatter/gather operation may be tracked (e.g. in a re-order buffer) through the retirement of micro-operations.

In the case of a scatter operation, storage is allocated in a buffer to hold the data elements corresponding to the generated addresses for storing to corresponding memory locations by the memory access unit. In some embodiments all of the data elements may be written into the buffer for a scatter operation at the one time (e.g. using a single micro-operation). The FSM changes the corresponding mask elements upon successful completion of a corresponding store. In some embodiments successful completion of the scatter operation may be accomplished through the execution of a micro-operation. In some embodiments such a micro-operation may be retired upon successful completion of the corresponding stores by the FSM.

In the case of a gather operation data merge logic, operatively coupled with the memory access unit and with a SIMD vector register writes corresponding data elements at in-register positions according to a respective position in their corresponding indices. For example, in one embodiment the data may be broadcast to all of the positions and an individual corresponding index could be used as a mask to change only a single position. In alternate embodiments multiple positions may be changed concurrently. The FSM changes the corresponding mask elements upon successful completion of a corresponding load.

It will be appreciated that by scheduling just a few micro-operations to transfer a set of indices from a SIMD vector register and a corresponding set of mask elements to an index array and initialize a finite state machine to store or load the data, in parallel or concurrently with the execution of other instructions and responsive to, and/or in support of scatter and/or gather operations, instruction throughput may be improved.

In the following description, numerous specific details such as processing logic, processor types, micro-architectural conditions, events, enablement mechanisms, and the like are set forth in order to provide a more thorough understanding of embodiments of the present invention. It will be appreciated, however, by one skilled in the art that the invention may be practiced without such specific details. Additionally, some well known structures, circuits, and the like have not been shown in detail to avoid unnecessarily obscuring embodiments of the present invention.

These and other embodiments of the present invention may be realized in accordance with the following teachings and it should be evident that various modifications and changes may be made in the following teachings without departing from the broader spirit and scope of the invention. The specification and drawings are, accordingly, to be regarded in an illustrative rather than restrictive sense and the invention measured only in terms of the claims and their equivalents.

FIG. 1 illustrates one embodiment of a computing system 100 for using an index array and finite state machine responsive to, and/or in support of scatter and/or gather operations. System 100 includes a component, such as a processor 102 to employ execution units including logic to perform algorithms for process data, in accordance with the present invention, such as in the embodiment described herein. System 100 is representative of processing systems based on the PENTIUM® III, PENTIUM® 4, Xeon™, Itanium®, XScale™ and/or StrongARM™ microprocessors available from Intel Corporation of Santa Clara, Calif., although other systems (including PCs having other microprocessors, engineering workstations, set-top boxes and the like) may also be used. In one embodiment, sample system 100 may execute a version of the WINDOWS™ operating system available from Microsoft Corporation of Redmond, Wash., although other operating systems (UNIX and Linux for example), embedded software, and/or graphical user interfaces, may also be used. Thus, embodiments of the present invention are not limited to any specific combination of hardware circuitry and software.

Embodiments are not limited to computer systems. Alternative embodiments of the present invention can be used in other devices such as handheld devices and embedded applications. Some examples of handheld devices include cellular phones, Internet Protocol devices, digital cameras, personal digital assistants (PDAs), and handheld PCs. Embedded applications can include a micro controller, a digital signal processor (DSP), system on a chip, network computers (NetPC), set-top boxes, network hubs, wide area network (WAN) switches, or any other system that can perform one or more instructions in accordance with at least one embodiment.

FIG. 1 is a block diagram of a computer system 100 formed with a processor 102 that includes one or more execution units 108 to perform an algorithm to perform at least one instruction in accordance with one embodiment of the present invention. One embodiment may be described in the context of a single processor desktop or server system, but alternative embodiments can be included in a multiprocessor system. System 100 is an example of a 'hub' system architecture. The computer system 100 includes a processor 102 to process data signals. The processor 102 can be a complex instruction set computer (CISC) microprocessor, a reduced instruction set computing (RISC) microprocessor, a very long instruction word (VLIW) microprocessor, a processor implementing a combination of instruction sets, or any other processor device, such as a digital signal processor, for example. The processor 102 is coupled to a processor bus 110 that can transmit data signals between the processor 102 and other components in the system 100. The elements of system 100 perform their conventional functions that are well known to those familiar with the art.

In one embodiment, the processor 102 includes a Level 1 (L1) internal cache memory 104. Depending on the architecture, the processor 102 can have a single internal cache or multiple levels of internal cache. Alternatively, in another embodiment, the cache memory can reside external to the processor 102. Other embodiments can also include a combination of both internal and external caches depending on the particular implementation and needs. Register file 106 can store different types of data in various registers including integer registers, floating point registers, status registers, and instruction pointer register.

Execution unit 108, including logic to perform integer and floating point operations, also resides in the processor 102. The processor 102 also includes a microcode (ucode) ROM that stores microcode for certain macroinstructions. For one embodiment, execution unit 108 includes logic to handle a packed instruction set 109. By including the packed instruction set 109 in the instruction set of a general-purpose processor 102, along with associated circuitry to execute the instructions, the operations used by many multimedia applications may be performed using packed data in a general-purpose processor 102. Thus, many multimedia applications can be accelerated and executed more efficiently by using the full width of a processor's data bus for performing operations on packed data. This can eliminate the need to transfer smaller units of data across the processor's data bus to perform one or more operations one data element at a time.

Alternate embodiments of an execution unit 108 can also be used in micro controllers, embedded processors, graphics devices, DSPs, and other types of logic circuits. System 100 includes a memory 120. Memory 120 can be a dynamic random access memory (DRAM) device, a static random access memory (SRAM) device, flash memory device, or other memory device. Memory 120 can store instructions and/or data represented by data signals that can be executed by the processor 102.

A system logic chip 116 is coupled to the processor bus 110 and memory 120. The system logic chip 116 in the illustrated embodiment is a memory controller hub (MCH). The processor 102 can communicate to the MCH 116 via a processor bus 110. The MCH 116 provides a high bandwidth memory path 118 to memory 120 for instruction and data storage and for storage of graphics commands, data and textures. The MCH 116 is to direct data signals between the processor 102, memory 120, and other components in the system 100 and to bridge the data signals between processor bus 110, memory 120, and system I/O 122. In some embodiments, the system logic chip 116 can provide a graphics port for coupling to a graphics controller 112. The MCH 116 is coupled to memory 120 through a memory interface 118. The graphics card 112 is coupled to the MCH 116 through an Accelerated Graphics Port (AGP) interconnect 114.

System 100 uses a proprietary hub interface bus 122 to couple the MCH 116 to the I/O controller hub (ICH) 130. The ICH 130 provides direct connections to some I/O devices via a local I/O bus. The local I/O bus is a high-speed I/O bus for connecting peripherals to the memory 120, chipset, and processor 102. Some examples are the audio controller, firmware hub (flash BIOS) 128, wireless transceiver 126, data storage 124, legacy I/O controller containing user input and keyboard interfaces, a serial expansion port such as Universal Serial Bus (USB), and a network controller 134. The data storage device 124 can comprise a hard disk drive, a floppy disk drive, a CD-ROM device, a flash memory device, or other mass storage device.

For another embodiment of a system, an instruction in accordance with one embodiment can be used with a system on a chip. One embodiment of a system on a chip comprises of a processor and a memory. The memory for one such system is a flash memory. The flash memory can be located on the same die as the processor and other system components. Additionally, other logic blocks such as a memory controller or graphics controller can also be located on a system on a chip.

Figure 2:
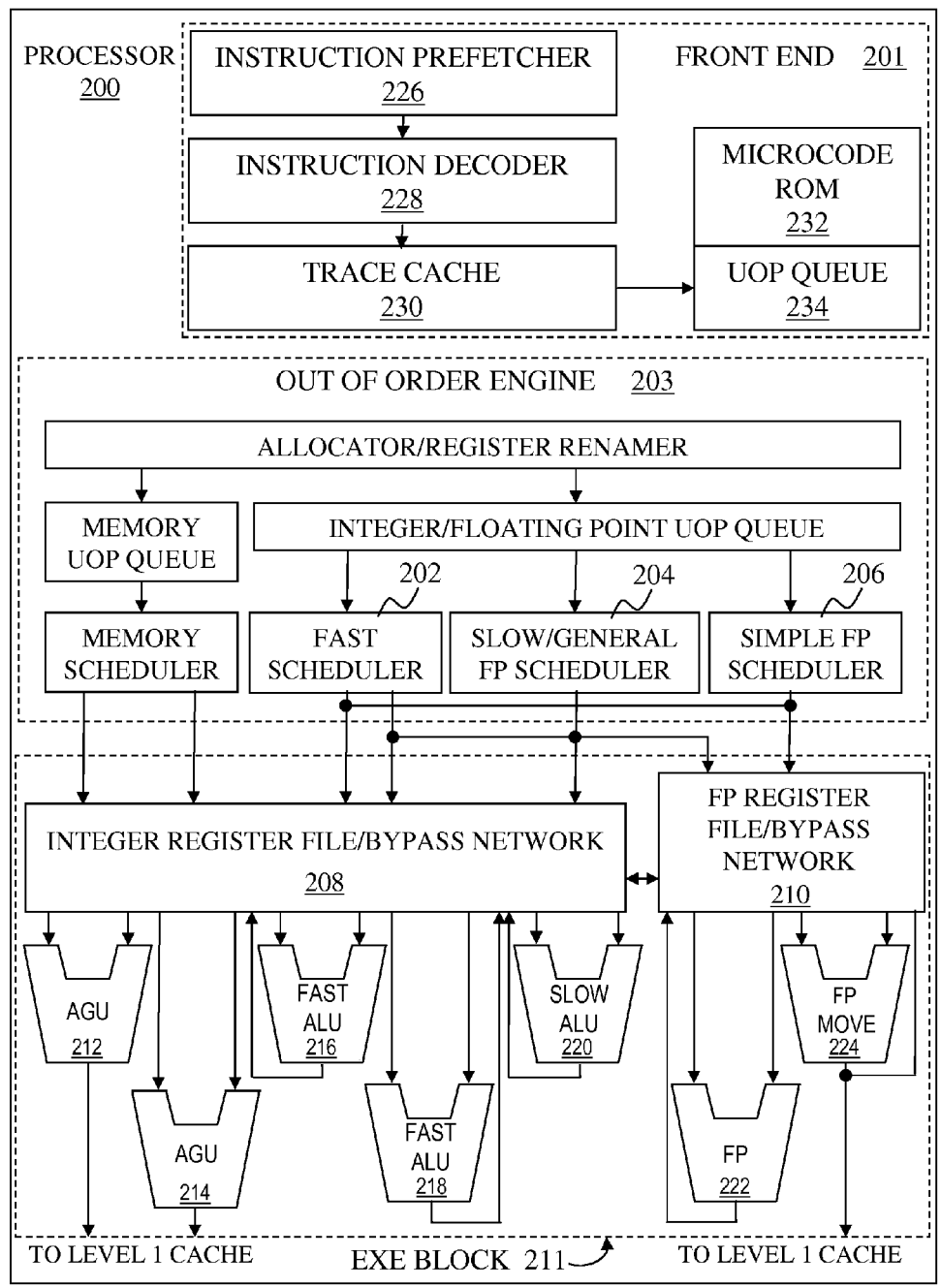
FIG. 2 illustrates one embodiment of a processor for using an index array and finite state machine responsive to, and/or in support of scatter and/or gather operations.

FIG. 2 illustrates one embodiment of a processor 200 for using an index array and finite state machine responsive to, and/or in support of scatter and/or gather operations. In some embodiments, an instruction in accordance with one embodiment can be implemented to operate on data elements having sizes of byte, word, doubleword, quadword, etc., as well as datatypes, such as single and double precision integer and floating point datatypes. In one embodiment the in-order front end 201 is the part of the processor 200 that fetches instructions to be executed and prepares them to be used later in the processor pipeline. The front end 201 may include several units. In one embodiment, the instruction prefetcher 226 fetches instructions from memory and feeds them to an instruction decoder 228 which in turn decodes or interprets them. For example, in one embodiment, the decoder decodes a received instruction into one or more operations called "micro-instructions" or "micro-operations" (also called micro ops or uops) that the machine can execute. In other embodiments, the decoder parses the instruction into an opcode and corresponding data and control fields that are used by the micro-architecture to perform operations in accordance with one embodiment. In one embodiment including a trace cache 230, the trace cache 230 takes decoded uops and assembles them into program ordered sequences or traces in the uop queue 234 for execution. When the trace cache 230 encounters a complex instruction, the microcode ROM 232 provides the uops needed to complete the operation.

Some instructions are converted into a single micro-op, whereas others need several micro-ops to complete the full operation. In one embodiment, if more than four micro-ops are needed to complete an instruction, the decoder 228 accesses the microcode ROM 232 to do the instruction. For one embodiment, an instruction can be decoded into a small number of micro ops for processing at the instruction decoder 228. In another embodiment, an instruction can be stored within the microcode ROM 232 should a number of micro-ops be needed to accomplish the operation. The trace cache 230 refers to a entry point programmable logic array (PLA) to determine a correct micro-instruction pointer for reading the micro-code sequences to complete one or more instructions in accordance with one embodiment from the micro-code ROM 232. After the microcode ROM 232 finishes sequencing micro-ops for an instruction, the front end 201 of the machine resumes fetching micro-ops from the trace cache 230. It will be appreciated that the inclusion of a trace cache 230 is not necessary for all embodiments.

The out-of-order execution engine 203 is where the instructions are prepared for execution. The out-of-order execution logic has a number of buffers to smooth out and re-order the flow of instructions to optimize performance as they go down the pipeline and get scheduled for execution. The allocator logic allocates the machine buffers and resources that each uop needs in order to execute. The register renaming logic renames logic registers onto entries in a register file. The allocator also allocates an entry for each uop in one of the two uop queues, one for memory operations and one for non-memory operations, in front of the instruction schedulers: memory scheduler, fast scheduler 202, slow/general floating point scheduler 204, and simple floating point scheduler 206. The uop schedulers 202, 204, 206, determine when a uop is ready to execute based on the readiness of their dependent input register operand sources and the availability of the execution resources the uops need to complete their operation. The fast scheduler 202 of one embodiment can schedule on each half of the main clock cycle while the other schedulers can only schedule once per main processor clock cycle. The schedulers arbitrate for the dispatch ports to schedule uops for execution.

Register files 208, 210, sit between the schedulers 202, 204, 206, and the execution units 212, 214, 216, 218, 220, 222, 224 in the execution block 211. There is a separate register file 208, 210, for integer and floating point operations, respectively. Each register file 208, 210, of one embodiment also includes a bypass network that can bypass or forward just completed results that have not yet been written into the register file to new dependent uops. The integer register file 208 and the floating point register file 210 are also capable of communicating data with the other. For one embodiment, the integer register file 208 is split into two separate register files, one register file for the low order 32 bits of data and a second register file for the high order 32 bits of data. The floating point register file 210 of one embodiment has 128 bit wide entries because floating point instructions typically have operands from 64 to 128 bits in width. Some embodiments of floating point register file 210 may have 256 bit wide, or 512 bit wide, or some other width entries. For some embodiments, in the floating point register file 210, each element may be separately written to at boundaries of 64 bits, 32 bits, 16 bits, etc.

The execution block 211 contains the execution units 212, 214, 216, 218, 220, 222, 224, where the instructions are actually executed. This section includes the register files 208, 210, that store the integer and floating point data operand values that the micro-instructions need to execute. The processor 200 of one embodiment is comprised of a number of execution units: address generation unit (AGU) 212, AGU 214, fast ALU 216, fast ALU 218, slow ALU 220, floating point ALU 222, floating point move unit 224. For one embodiment, the floating point execution blocks 222, 224, execute floating point, MMX, SIMD, SSE and AVX, or other operations. The floating point ALU 222 of one embodiment includes a 64 bit by 64 bit floating point divider to execute divide, square root, and remainder micro-ops. For embodiments of the present invention, instructions involving a floating point value may be handled with the floating point hardware. In one embodiment, the ALU operations go to the high-speed ALU execution units 216, 218. The fast ALUs 216, 218, of one embodiment can execute fast operations with an effective latency of half a clock cycle. For one embodiment, most complex integer operations go to the slow ALU 220 as the slow ALU 220 includes integer execution hardware for long latency type of operations, such as a multiplier, shifts, flag logic, and branch processing. Memory load/store operations are executed by the AGUs 212, 214. For one embodiment, the integer ALUs 216, 218, 220, are described in the context of performing integer operations on 64 bit data operands. In alternative embodiments, the ALUs 216, 218, 220, can be implemented to support a variety of data bits including 16, 32, 128, 256, etc. Similarly, the floating point units 222, 224, can be implemented to support a range of operands having bits of various widths. For one embodiment, the floating point units 222, 224, can operate on 128 bits wide packed data operands in conjunction with SIMD and multimedia instructions.

In one embodiment, the uops schedulers 202, 204, 206, dispatch dependent operations before the parent load has finished executing. As uops are speculatively scheduled and executed in processor 200, the processor 200 also includes logic to handle memory misses. If a data load misses in the data cache, there can be dependent operations in flight in the pipeline that have left the scheduler with temporarily incorrect data. In some embodiments, a replay mechanism may track and re-execute instructions that use incorrect data. Only the dependent operations need to be replayed and the independent ones are allowed to complete. The schedulers and replay mechanism of one embodiment of a processor are also designed to catch instructions that provide vector scatter and/or gather functionality. In some alternative embodiments without a replay mechanism, speculative execution of uops may be prevented and dependent uops may reside in the schedulers 202, 204, 206 until they are canceled, or until they cannot be canceled.

The term "registers" may refer to the on-board processor storage locations that are used as part of instructions to identify operands. In other words, registers may be those that are usable from the outside of the processor (from a programmer's perspective). However, the registers of an embodiment should not be limited in meaning to a particular type of circuit. Rather, a register of an embodiment is capable of storing and providing data, and performing the functions described herein. The registers described herein can be implemented by circuitry within a processor using any number of different techniques, such as dedicated physical registers, dynamically allocated physical registers using register renaming, combinations of dedicated and dynamically allocated physical registers, etc. In one embodiment, integer registers store thirty-two bit integer data. A register file of one embodiment also contains eight multimedia SIMD registers for packed data. For the discussions below, the registers are understood to be data registers designed to hold packed data, such as 64 bits wide MMX™ registers (also referred to as 'mm' registers in some instances) in microprocessors enabled with MMX technology from Intel Corporation of Santa Clara, Calif. These MMX registers, available in both integer and floating point forms, can operate with packed data elements that accompany SIMD and SSE instructions. The, 128 bits wide XMM registers relating to SSE2, SSE3, SSE4 (referred to generically as "SSEx") technology can also be used to hold such packed data operands. Similarly, 256 bits wide YMM registers and 512 bits wide ZMM registers relating to AVX, AVX2, AVX3 technology (or beyond) may overlap with XMM registers and can be used to hold such wider packed data operands. In one embodiment, in storing packed data and integer data, the registers do not need to differentiate between the two data types. In one embodiment, integer and floating point are either contained in the same register file or different register files. Furthermore, in one embodiment, floating point and integer data may be stored in different registers or the same registers.

Figure 3A:
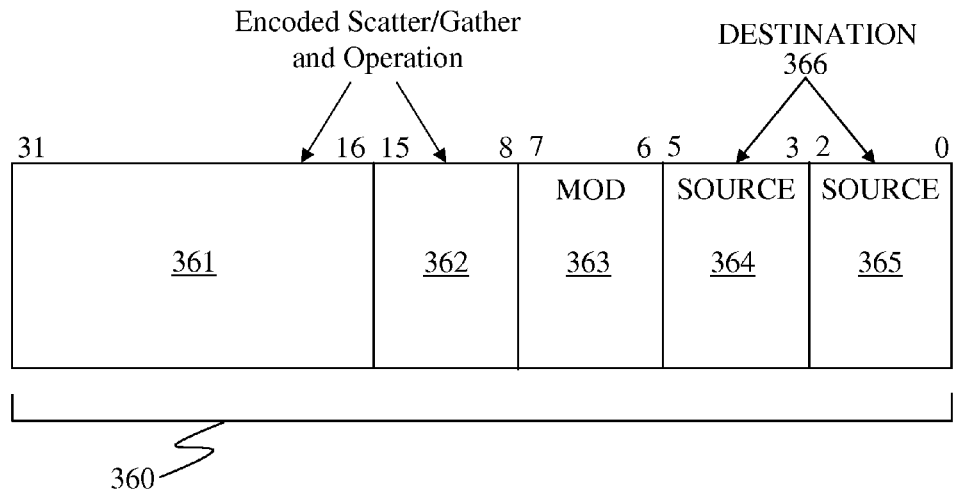
FIG. 3A illustrates an instruction encoding to provide vector scatter and/or gather functionality according to one embodiment.

FIG. 3A is a depiction of one embodiment of an operation encoding (opcode) format 360, having thirty-two or more bits, and register/memory operand addressing modes corresponding with a type of opcode format described in the "Intel® 64 and IA-32 Intel Architecture Software Developer's Manual Combined Volumes 2A and 2B: Instruction Set Reference A-Z," which is which is available from Intel Corporation, Santa Clara, Calif. on the world-wide-web (www) at intel.com/products/processor/manuals/. In one embodiment, and instruction may be encoded by one or more of fields 361 and 362. Up to two operand locations per instruction may be identified, including up to two source operand identifiers 364 and 365. For one embodiment, destination operand identifier 366 is the same as source operand identifier 364, whereas in other embodiments they are different. For an alternative embodiment, destination operand identifier 366 is the same as source operand identifier 365, whereas in other embodiments they are different. In one embodiment, one of the source operands identified by source operand identifiers 364 and 365 is overwritten by the results of the instruction, whereas in other embodiments identifier 364 corresponds to a source register element and identifier 365 corresponds to a destination register element. For one embodiment, operand identifiers 364 and 365 may be used to identify 32-bit or 64-bit source and destination operands.

Figure 3B:
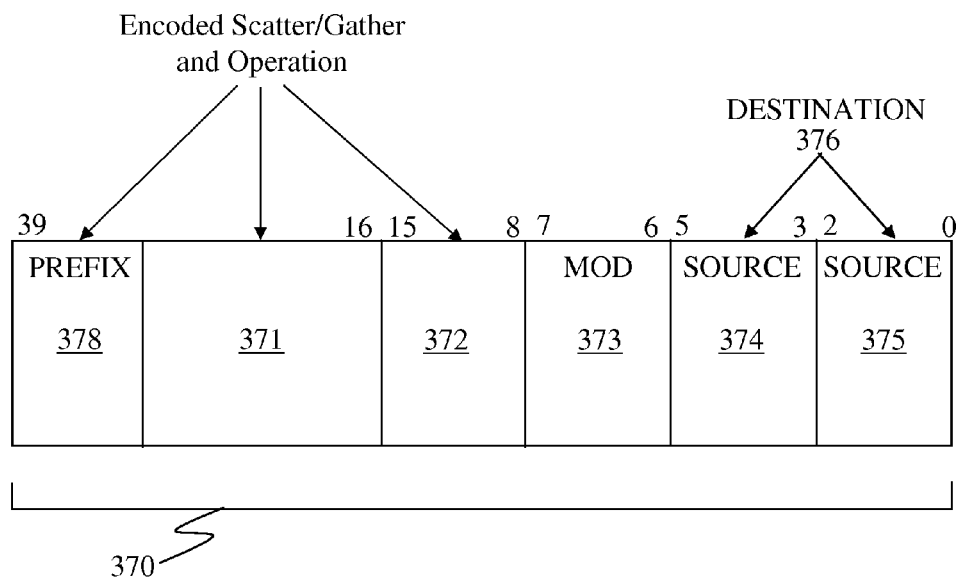
FIG. 3B illustrates an instruction encoding to provide vector scatter and/or gather functionality according to another embodiment.

FIG. 3B is a depiction of another alternative operation encoding (opcode) format 370, having forty or more bits. Opcode format 370 corresponds with opcode format 360 and comprises an optional prefix byte 378. An instruction according to one embodiment may be encoded by one or more of fields 378, 371, and 372. Up to two operand locations per instruction may be identified by source operand identifiers 374 and 375 and by prefix byte 378. For one embodiment, prefix byte 378 may be used to identify 32-bit or 64-bit source and destination operands. For one embodiment, destination operand identifier 376 is the same as source operand identifier 374, whereas in other embodiments they are different. For an alternative embodiment, destination operand identifier 376 is the same as source operand identifier 375, whereas in other embodiments they are different. In one embodiment, an instruction operates on one or more of the operands identified by operand identifiers 374 and 375 and one or more operands identified by the operand identifiers 374 and 375 is overwritten by the results of the instruction, whereas in other embodiments, operands identified by identifiers 374 and 375 are written to another data element in another register. Opcode formats 360 and 370 allow register to register, memory to register, register by memory, register by register, register by immediate, register to memory addressing specified in part by MOD fields 363 and 373 and by optional scale-index-base and displacement bytes.

Figure 3C:
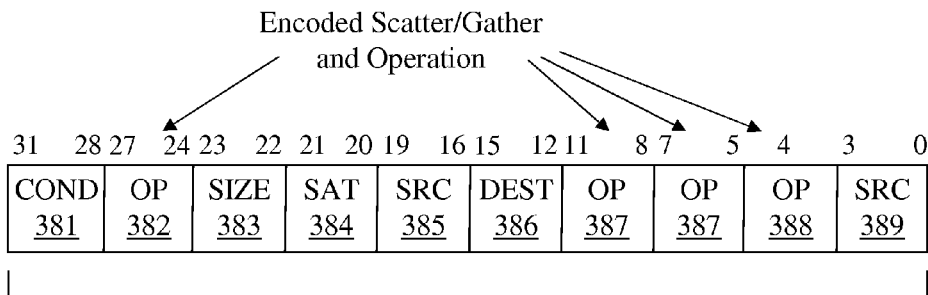
FIG. 3C illustrates an instruction encoding to provide vector scatter and/or gather functionality according to another embodiment.

Turning next to FIG. 3C, in some alternative embodiments, 64-bit (or 128-bit, or 256-bit, or 512-bit or more) single instruction multiple data (SIMD) arithmetic operations may be performed through a coprocessor data processing (CDP) instruction. Operation encoding (opcode) format 380 depicts one such CDP instruction having CDP opcode fields 382 and 389. The type of CDP instruction, for alternative embodiments, operations may be encoded by one or more of fields 383, 384, 387, and 388. Up to three operand locations per instruction may be identified, including up to two source operand identifiers 385 and 390 and one destination operand identifier 386. One embodiment of the coprocessor can operate on 8, 16, 32, and 64 bit values. For one embodiment, an instruction is performed on integer data elements. In some embodiments, an instruction may be executed conditionally, using condition field 381. For some embodiments, source data sizes may be encoded by field 383. In some embodiments, Zero (Z), negative (N), carry (C), and overflow (V) detection can be done on SIMD fields. For some instructions, the type of saturation may be encoded by field 384.

Figure 3D:
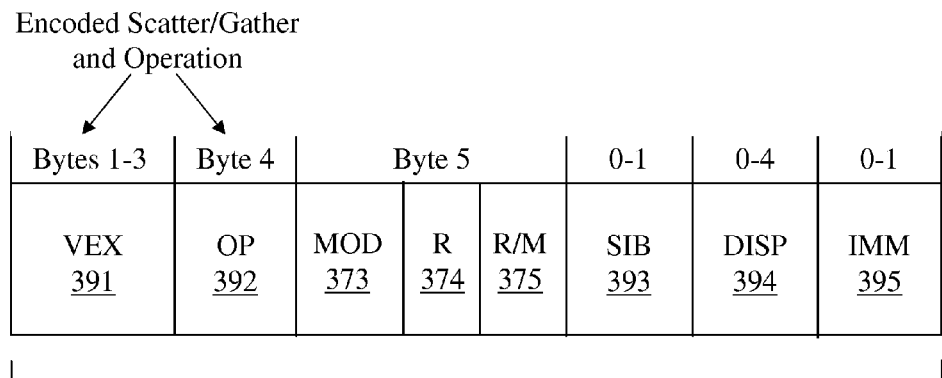
FIG. 3D illustrates an instruction encoding to provide vector scatter and/or gather functionality according to another embodiment.

Turning next to FIG. 3D is a depiction of another alternative operation encoding (opcode) format 397, to provide vector scatter and/or gather functionality according to another embodiment, corresponding with a type of opcode format described in the "Intel® Advanced Vector Extensions Programming Reference," which is available from Intel Corp., Santa Clara, Calif. on the world-wide-web (www) at intel.com/products/processor/manuals/.

The original x86 instruction set provided for a 1-byte opcode with various formats of address syllable and immediate operand contained in additional bytes whose presence was known from the first "opcode" byte. Additionally, there were certain byte values that were reserved as modifiers to the opcode (called prefixes, as they had to be placed before the instruction). When the original palette of 256 opcode bytes (including these special prefix values) was exhausted, a single byte was dedicated as an escape to a new set of 256 opcodes. As vector instructions (e.g., SIMD) were added, a need for more opcodes was generated, and the "two byte" opcode map also was insufficient, even when expanded through the use of prefixes. To this end, new instructions were added in additional maps which use 2 bytes plus an optional prefix as an identifier.

Additionally, in order to facilitate additional registers in 64-bit mode, an additional prefix may be used (called "REX") in between the prefixes and the opcode (and any escape bytes necessary to determine the opcode). In one embodiment, the REX may have 4 "payload" bits to indicate use of additional registers in 64-bit mode. In other embodiments it may have fewer or more than 4 bits. The general format of at least one instruction set (which corresponds generally with format 360 and/or format 370) is illustrated generically by the following:

[prefixes] [rex] escape [escape2] opcode modrm (etc.)

Opcode format 397 corresponds with opcode format 370 and comprises optional VEX prefix bytes 391 (beginning with C4 hex or C5 hex in one embodiment) to replace most other commonly used legacy instruction prefix bytes and escape codes. For example, the following illustrates an embodiment using two fields to encode an instruction, which may be used when a second escape code is not present in the original instruction. In the embodiment illustrated below, legacy escape is represented by a new escape value, legacy prefixes are fully compressed as part of the "payload" bytes, legacy prefixes are reclaimed and available for future expansion, and new features are added (e.g., increased vector length and an additional source register specifier).

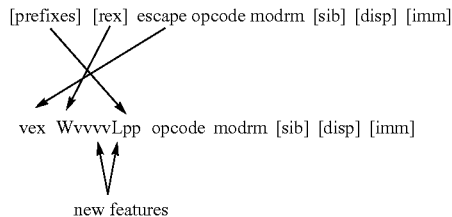

When a second escape code is present in the original instruction, or when extra bits (e.g., the XB and W fields) in the REX field need to be used. In the alternative embodiment illustrated below, the first legacy escape and legacy prefixes are compressed similar to the above, and the second escape code is compressed in a "map" field, with future map or feature space available, and again, new features are added (e.g., increased vector length and an additional source register specifier).

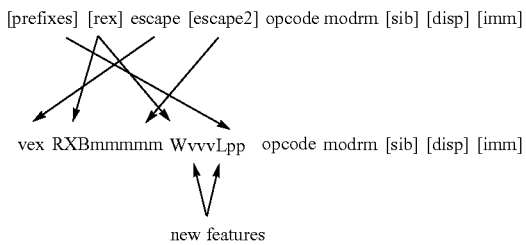

An instruction according to one embodiment may be encoded by one or more of fields 391 and 392. Up to four operand locations per instruction may be identified by field 391 in combination with source operand identifiers 374 and 375 and in combination with an optional scale-index-base (SIB) identifier 393, an optional displacement identifier 394, and an optional immediate byte 395. For one embodiment, VEX prefix bytes 391 may be used to identify 32-bit or 64-bit source and destination operands and/or 128-bit or 256-bit SIMD register or memory operands. For one embodiment, the functionality provided by opcode format 397 may be redundant with opcode format 370, whereas in other embodiments they are different. Opcode formats 370 and 397 allow register to register, memory to register, register by memory, register by register, register by immediate, register to memory addressing specified in part by MOD field 373 and by optional (SIB) identifier 393, an optional displacement identifier 394, and an optional immediate byte 395.

Figure 3E:
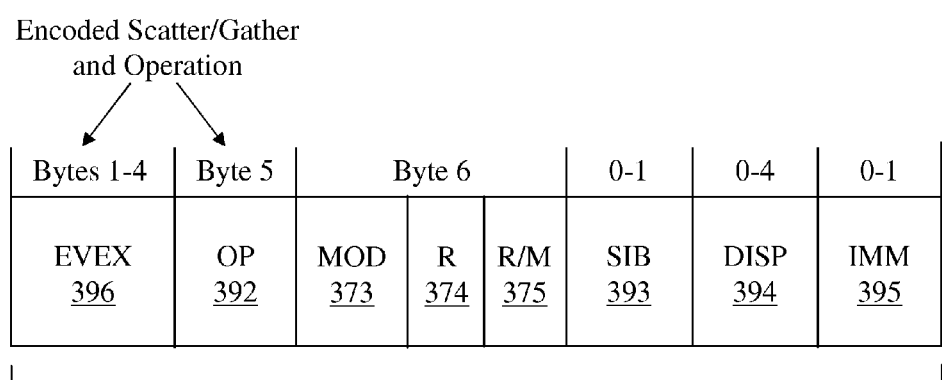
FIG. 3E illustrates an instruction encoding to provide vector scatter and/or gather functionality according to another embodiment.

Turning next to FIG. 3E is a depiction of another alternative operation encoding (opcode) format 398, to provide vector scatter and/or gather functionality according to another embodiment. Opcode format 398 corresponds with opcode formats 370 and 397 and comprises optional EVEX prefix bytes 396 (beginning with 62 hex in one embodiment) to replace most other commonly used legacy instruction prefix bytes and escape codes and provide additional functionality. An instruction according to one embodiment may be encoded by one or more of fields 396 and 392. Up to four operand locations per instruction and a mask may be identified by field 396 in combination with source operand identifiers 374 and 375 and in combination with an optional scale-index-base (SIB) identifier 393, an optional displacement identifier 394, and an optional immediate byte 395. For one embodiment, EVEX prefix bytes 396 may be used to identify 32-bit or 64-bit source and destination operands and/or 128-bit, 256-bit or 512-bit SIMD register or memory operands. For one embodiment, the functionality provided by opcode format 398 may be redundant with opcode formats 370 or 397, whereas in other embodiments they are different. Opcode format 398 allows register to register, memory to register, register by memory, register by register, register by immediate, register to memory addressing, with masks, specified in part by MOD field 373 and by optional (SIB) identifier 393, an optional displacement identifier 394, and an optional immediate byte 395. The general format of at least one instruction set (which corresponds generally with format 360 and/or format 370) is illustrated generically by the following:

evex1 RXBmmmmm WvvvLpp evex4 opcode modrm [sib] [disp] [imm]

For one embodiment an instruction encoded according to the EVEX format 398 may have additional "payload" bits that may be used to provide vector scatter and/or gather functionality with additional new features such as, for example, a user configurable mask register, or an additional operand, or selections from among 128-bit, 256-bit or 512-bit vector registers, or more registers from which to select, etc.

For example, where VEX format 397 may be used to provide vector scatter and/or gather functionality with an explicit mask and with or without an additional operation that is unary such as a type conversion, the EVEX format 398 may be used to provide vector scatter and/or gather functionality with an explicit user configurable mask and with or without an additional operation that is binary such as addition or multiplication requiring an additional operand.

Some embodiments of EVEX format 398 may also be used to provide vector scatter and/or gather functionality and an implicit completion mask and with additional operation is ternary. Additionally, where VEX format 397 may be used to provide vector scatter and/or gather functionality on 128-bit or 256-bit vector registers, EVEX format 398 may be used to provide vector scatter and/or gather functionality on 128-bit, 256-bit, 512-bit or larger (or smaller) vector registers. It will be appreciated that some embodiments of scatter and/or gather instructions may also be implemented as scatter and/or gather prefetches to prefetch the required memory locations into cache memory. Example instructions to provide vector scatter and/or gather functionality are illustrated by the following examples:

| Instruction | destination/ 1st source | source1 | mask | source2 | source3 | description |
|---|---|---|---|---|---|---|
| gather | Vmm1 | | Mask1 | Mem32 | Vindex | Use Vindex and Mem32 to gather according to Mask1 into Vmm1 |
| scatter | Vmm1 | | Mask1 | Mem32 | Vindex | Use Vindex and Mem32 to scatter from Vmm1 according to Mask1 |
| gather-pref | [read/write] | | Mask1 | Mem32 | Vindex | Use Vindex and Mem32 to gather-prefetch, optionally with write permission, according to Mask1 into cache memory |
| gather-op | Vmm1 | Vmm2 | | Mem32 | Vindex | Use Vindex and Mem32 to gather (implicit mask) into Vmm1 and then apply Op to Vmm1 and Vmm2 |
| scatter-op | Vmm1 | Vmm2 | | Mem32 | Vindex | Apply Op to Vmm1 and Vmm2 then use Vindex and Mem32 to scatter (implicit mask) |
| gather-op | Vmm1 | | Mask1 | Mem32 | Vindex | Use Vindex and Mem32 to gather according to Mask1 into Vmm1 and then apply unary Op to Vmm1 |
| scatter-op | Vmm1 | | Mask1 | Mem32 | Vindex | Apply unary Op to Vmm1 and use Vindex and Mem32 to scatter according to Mask1 |

Figure 4A:
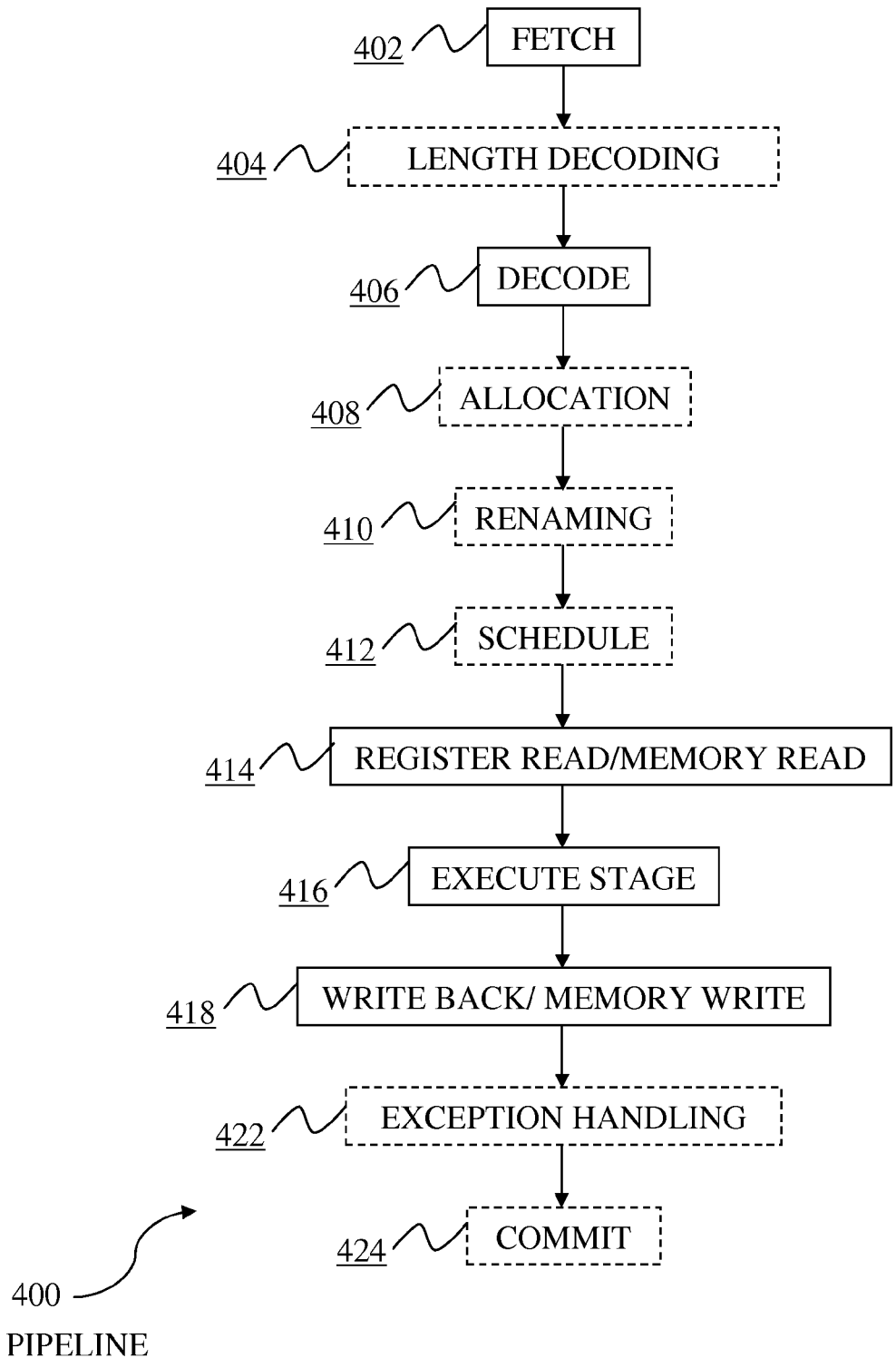
FIG. 4A illustrates a block diagram for one embodiment of stages in a processor micro-architecture to execute instructions that provide vector scatter and/or gather functionality.
Figure 4B:
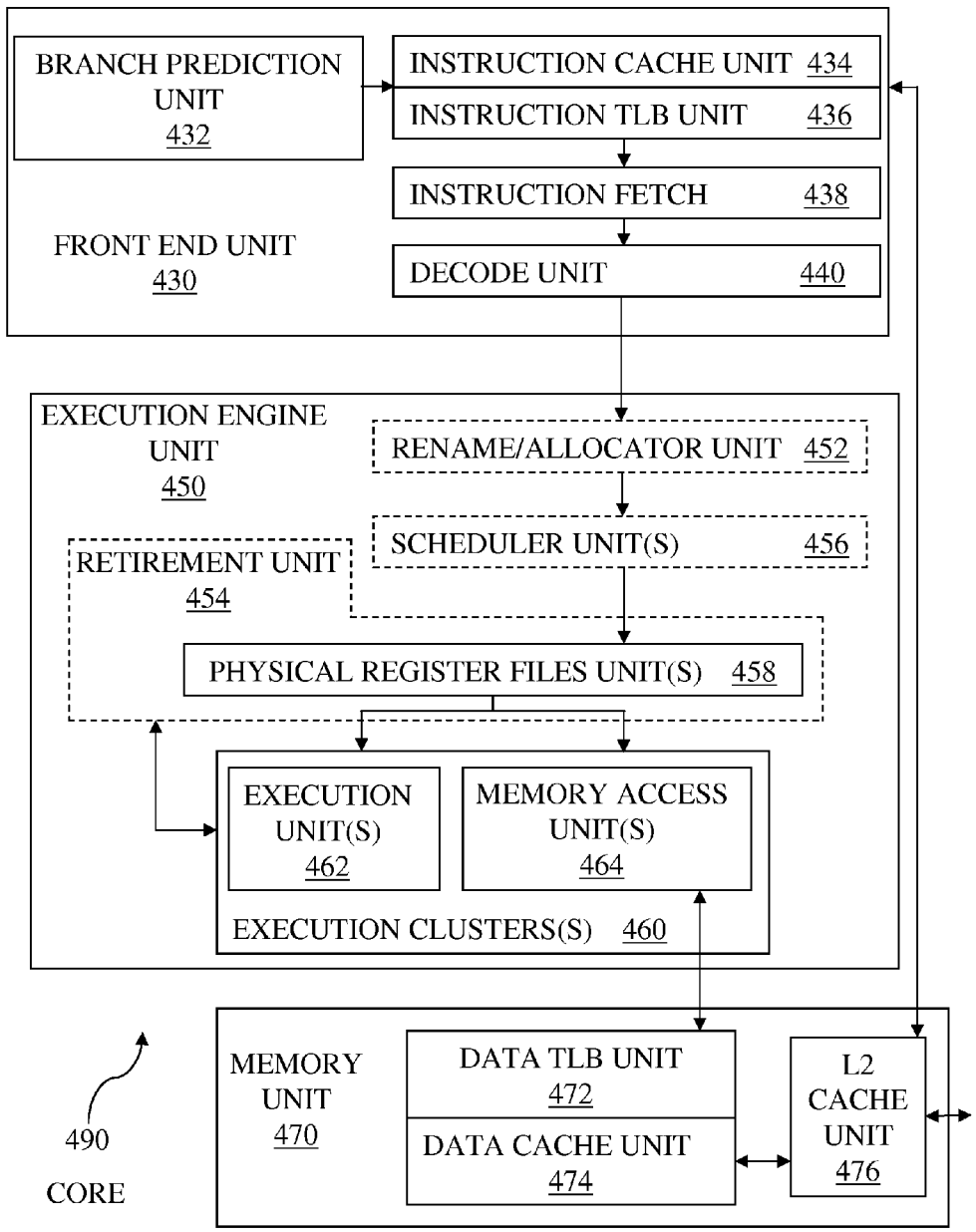
FIG. 4B illustrates elements of one embodiment of a processor micro-architecture to execute instructions that provide vector scatter and/or gather functionality.

FIG. 4A is a block diagram illustrating an in-order pipeline and a register renaming stage, out-of-order issue/execution pipeline according to at least one embodiment of the invention. FIG. 4B is a block diagram illustrating an in-order architecture core and a register renaming logic, out-of-order issue/execution logic to be included in a processor according to at least one embodiment of the invention. The solid lined boxes in FIG. 4A illustrate the in-order pipeline, while the dashed lined boxes illustrates the register renaming, out-of-order issue/execution pipeline. Similarly, the solid lined boxes in FIG. 4B illustrate the in-order architecture core, while the dashed lined boxes illustrates the register renaming logic and out-of-order issue/execution logic.

In FIG. 4A, a processor pipeline 400 includes a fetch stage 402, a length decode stage 404, a decode stage 406, an allocation stage 408, a renaming stage 410, a scheduling (also known as a dispatch or issue) stage 412, a register read/memory read stage 414, an execute stage 416, a write back/memory write stage 418, an exception handling stage 422, and a commit stage 424.

In FIG. 4B, arrows denote a coupling between two or more units and the direction of the arrow indicates a direction of data flow between those units. FIG. 4B shows processor core 490 including a front end unit 430 coupled to an execution engine unit 450, and both are coupled to a memory unit 470.

The core 490 may be a reduced instruction set computing (RISC) core, a complex instruction set computing (CISC) core, a very long instruction word (VLIW) core, or a hybrid or alternative core type. As yet another option, the core 490 may be a special-purpose core, such as, for example, a network or communication core, compression engine, graphics core, or the like.

The front end unit 430 includes a branch prediction unit 432 coupled to an instruction cache unit 434, which is coupled to an instruction translation lookaside buffer (TLB) 436, which is coupled to an instruction fetch unit 438, which is coupled to a decode unit 440. The decode unit or decoder may decode instructions, and generate as an output one or more micro-operations, micro-code entry points, microinstructions, other instructions, or other control signals, which are decoded from, or which otherwise reflect, or are derived from, the original instructions. The decoder may be implemented using various different mechanisms. Examples of suitable mechanisms include, but are not limited to, look-up tables, hardware implementations, programmable logic arrays (PLAs), microcode read only memories (ROMs), etc. The instruction cache unit 434 is further coupled to a level 2 (L2) cache unit 476 in the memory unit 470. The decode unit 440 is coupled to a rename/allocator unit 452 in the execution engine unit 450.

The execution engine unit 450 includes the rename/allocator unit 452 coupled to a retirement unit 454 and a set of one or more scheduler unit(s) 456. The scheduler unit(s) 456 represents any number of different schedulers, including reservations stations, central instruction window, etc. The scheduler unit(s) 456 is coupled to the physical register file(s) unit(s) 458. Each of the physical register file(s) units 458 represents one or more physical register files, different ones of which store one or more different data types, such as scalar integer, scalar floating point, packed integer, packed floating point, vector integer, vector floating point, etc., status (e.g., an instruction pointer that is the address of the next instruction to be executed), etc. The physical register file(s) unit(s) 458 is overlapped by the retirement unit 454 to illustrate various ways in which register renaming and out-of-order execution may be implemented (e.g., using a reorder buffer(s) and a retirement register file(s), using a future file(s), a history buffer(s), and a retirement register file(s); using a register maps and a pool of registers; etc.). Generally, the architectural registers are visible from the outside of the processor or from a programmer's perspective. The registers are not limited to any known particular type of circuit. Various different types of registers are suitable as long as they are capable of storing and providing data as described herein. Examples of suitable registers include, but are not limited to, dedicated physical registers, dynamically allocated physical registers using register renaming, combinations of dedicated and dynamically allocated physical registers, etc. The retirement unit 454 and the physical register file(s) unit(s) 458 are coupled to the execution cluster(s) 460. The execution cluster(s) 460 includes a set of one or more execution units 462 and a set of one or more memory access units 464. The execution units 462 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 456, physical register file(s) unit(s) 458, and execution cluster(s) 460 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster, and in the case of a separate memory access pipeline, certain embodiments are implemented in which only the execution cluster of this pipeline has the memory access unit(s) 464). It should also be understood that where separate pipelines are used, one or more of these pipelines may be out-of-order issue/execution and the rest in-order.

The set of memory access units 464 is coupled to the memory unit 470, which includes a data TLB unit 472 coupled to a data cache unit 474 coupled to a level 2 (L2) cache unit 476. In one exemplary embodiment, the memory access units 464 may include a load unit, a store address unit, and a store data unit, each of which is coupled to the data TLB unit 472 in the memory unit 470. The L2 cache unit 476 is coupled to one or more other levels of cache and eventually to a main memory.

By way of example, the exemplary register renaming, out-of-order issue/execution core architecture may implement the pipeline 400 as follows: 1) the instruction fetch 438 performs the fetch and length decoding stages 402 and 404; 2) the decode unit 440 performs the decode stage 406; 3) the rename/allocator unit 452 performs the allocation stage 408 and renaming stage 410; 4) the scheduler unit(s) 456 performs the schedule stage 412; 5) the physical register file(s) unit(s) 458 and the memory unit 470 perform the register read/memory read stage 414; the execution cluster 460 perform the execute stage 416; 6) the memory unit 470 and the physical register file(s) unit(s) 458 perform the write back/memory write stage 418; 7) various units may be involved in the exception handling stage 422; and 8) the retirement unit 454 and the physical register file(s) unit(s) 458 perform the commit stage 424.

The core 490 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.).

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes a separate instruction and data cache units 434/474 and a shared L2 cache unit 476, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Figure 5:
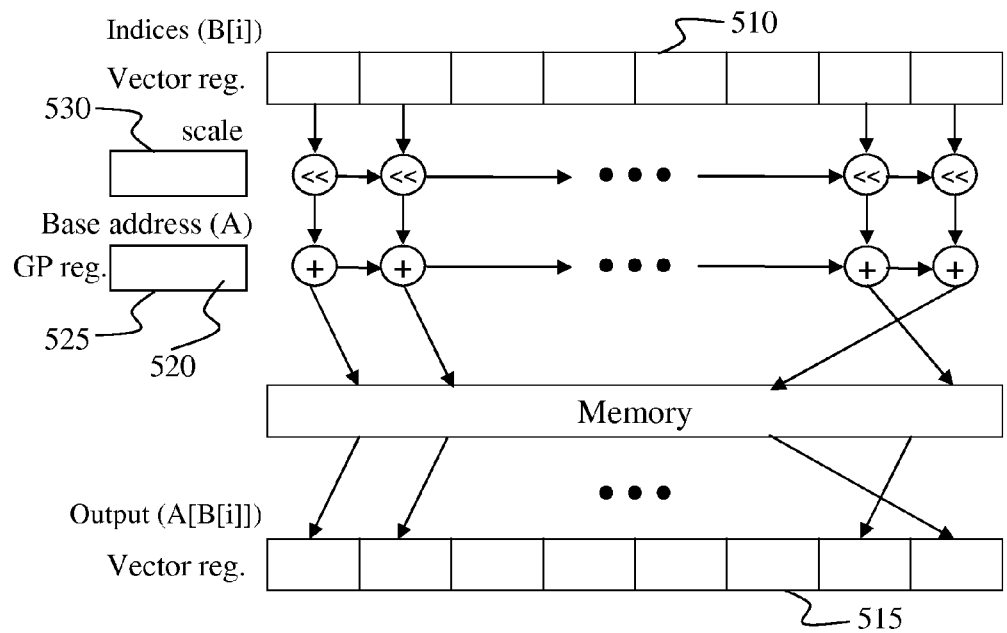
FIG. 5 illustrates one embodiment of a gather instruction that conditionally loads a set of elements into a destination SIMD register.

FIG. 5 illustrates one embodiment in which a gather instruction conditionally loads a set of data elements (e.g., up to sixteen 32-bit or eight 64-bit floating-point data elements for 512-bit SIMD) and packs them into a destination register 515. The elements are specified via a base address 520 passed in a general-purpose register 525, a scale 530 passed as an immediate, an index register 510 passed as a SIMD register (holding packed indices), and an optional displacement (not shown). Data elements will only be loaded if their corresponding mask bit is one. The mask register in this implementation is a dedicated mask register, alternatively the mask register may be a SIMD register, and the mask bit for an element is the sign bit of the corresponding element from the mask register. Mask elements are treated as the same size as index elements. If an element's mask bit is not set, the corresponding element of the destination register (a SIMD register) is left unchanged. Upon completion of the gather operation, the entire mask register is set to zero by the gather instruction unless its execution is interrupted by an exception.

In one embodiment, when a gather operation for gathering a predetermined set of data is terminated before completion, destination register 515 temporarily stores or preserves the data already collected (e.g., a partial subset of the predetermined set of data).

Figure 6:
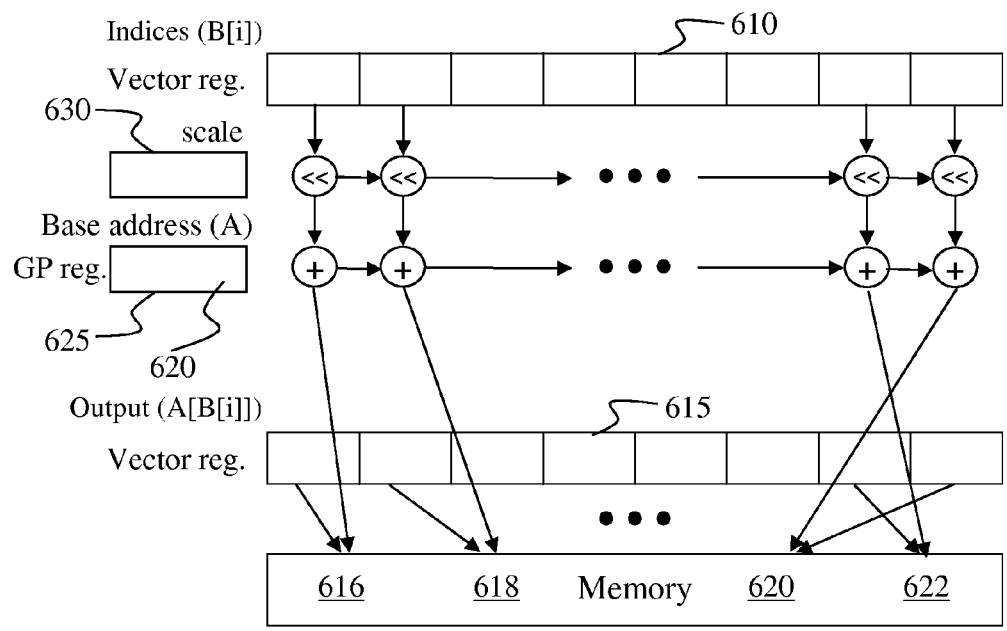
FIG. 6 illustrates one embodiment of a scatter instruction that conditionally stores a set of elements from a source SIMD register.

FIG. 6 illustrates one embodiment in which a scatter instruction conditionally stores a set of elements from a source SIMD register 615, ordering writes to any overlapping destination memory locations from LSB to MSB of the source. The destination memory locations 616, 618, 620, and 622 are specified as described above for the gather instruction. Elements will only be stored if their corresponding mask bit is one. The entire mask register may be set to zero by execution of the scatter instruction unless the scatter instruction triggers an exception. This instruction can be suspended by an exception if at least one element is already scattered (just as the gather instruction above). In some implementations, only writes to overlapping destination locations are guaranteed to be ordered with respect to each other (from LSB to MSB of the source registers). Overlap may be determined as follows. Each element corresponds to a set of byte-sized locations, [(index*scale):(index*scale+ data element size-1)]. If any two locations from two different elements are the same, the elements overlap. Writes that are not overlapped may occur in any order. In some embodiments, if two or more destination locations completely overlap, the "earlier" write(s) may be skipped. In some implementations, elements may be scattered in any order (if there is no overlap), but faults must be delivered in a right-to-left, or other particular pre-determined order.

Figure 7:
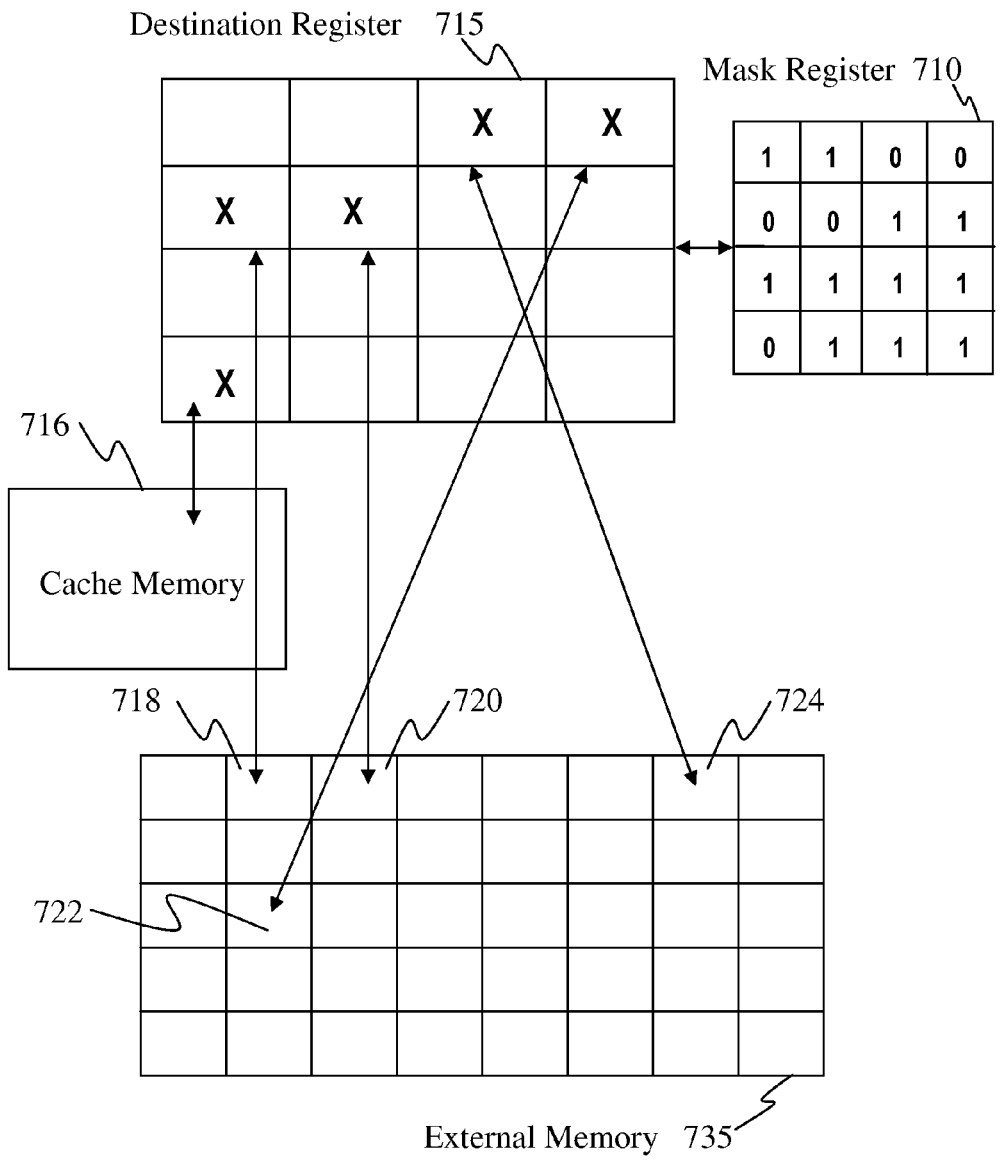
FIG. 7 is a schematic illustration of the flow of data in a system to support scatter and/or gather operations.

FIG. 7 is a schematic illustration of the flow of data in a system to support scatter and/or gather operations. Data may be stored in a system (e.g., such as systems described herein in reference to FIGS. 1 and 2) in cache memory 716 and/or external memory 735. Data may be gathered from contiguous locations 718 and 720 and/or non-contiguous or non-adjacent locations 722 and 724 (e.g., in external memory 735). Cache memory 716 is typically internal to a processor and external memory 735 is typically external to a processor (e.g., processors 140, 160, 270, and/or 280, each described in reference to one of FIGS. 1 and 2). However, in various embodiments, each of cache memory 716 and/or external memory 735 may be internal or external to a processor. External memory 735 may include or be analogous to, for example, 202, 204, 110 or other memories.

Cache memory 716 and/or external memory 735 may include, for example, random access memory (RAM), read only memory (ROM), dynamic RAM (DRAM), synchronous DRAM (SD-RAM), flash memory, volatile memory, non-volatile memory, cache memory, buffer, short term memory unit, long term memory unit, or other suitable memory units or storage units. Cache memory 716 may include data duplicating original values stored elsewhere or computed earlier, where the original data may be relatively more expensive to fetch (e.g., due to longer access time) or to compute, compared to the cost of reading the cache memory 716. Cache memory 716 may include pages, memory lines, or other suitable structures. Additional or other suitable memory may be used.

A gather operation may read data from two or more of non-contiguous memory locations 722 and 724 (e.g., in external memory 735) and write the data contiguously to a register memory, such as destination register 715. The status of the gathering of the data to destination register 715 may be recorded or written to a mask register 710. Register memories (e.g., destination, mask and/or other register memories) may be relatively small storage spaces typically within a processor. The contents of register memories may be accessed more quickly than storage placed elsewhere. Destination register 715 (e.g., a load register) may be for example, a counter machine, a pointer machine, a random access machine (RAM), a random access stored program machine model (RASP) or other memories. Mask register 710 (e.g., a shadow register) may have data fields, elements, or placeholders, holding for example '0' and '1' flags or values, shadowing or tracking the state or storage capacity of destination register 715.

Gather and scatter operations may be implemented to access data elements, particularly in applications having widely dispersed data elements. The dispersed data elements may be gathered for storing in a contiguous manner or in a single location, for example, in destination register 715 and/or scattered to two or more non-contiguous memory locations. In one embodiment, a gather instruction reads, copies, replicates, transfers, or contiguously writes each data element from two or more non-contiguous memory locations 722 and 724 (e.g., in cache memory 716 and/or external memory 735) to destination register 715, and vice versa with regard to the scatter instruction. Such gather processes are referred to as "packing" data elements and/or "packing" destination register 715. By packing data elements into a single location (e.g., destination register 715), a processor (e.g., FIGS. 1 and 2) may load, process, monitor or otherwise use the data collectively, simultaneously, in unison, and/or in sequence for executing operations on the data in a minimal number of cycles (e.g., one cycle).

Gather and/or scatter operations may be interrupted, possibly because the non-contiguous data delays the progress of the operation. In some embodiments, the state of the gather operation may be saved. Thus, when the gather operation is restarted, a repeat of the entire gather operation may not be required. Storing a record of which data elements have been and have not been gathered in for example register 710, may allow a restart of the gather instruction where the gather operation was interrupted.

In some embodiments, the gather operation may gather (e.g., read or access) each of a set of (e.g., 16) data elements from a two or more contiguous or non-contiguous memory locations in cache memory 716 and/or external memory 735. A gather operation may use as an input or may include a pointer to a memory page in cache memory 716. When data is spread across a boundary of a memory page, or no page memory address is provided, the gather operation may retrieve the data from external memory 735 which may take a relatively long time. In one embodiment, for each data element, the gather operation may first be pointed to cache memory 716 and if the gather is unsuccessful, may proceed to access the data from external memory 735.

The gather operation may store or pack data elements into destination register 715 (e.g., a load register). In one embodiment, destination register 715 may include multiple (e.g., 16) separate data elements, for example, used for a single gather operation. The data elements or vectors in destination register 715 may include data copied from the memory from which the data element was retrieved and/or pointers to the memory location from which the data element was retrieved. In some embodiments, the gather operation may access cache memory 716, local memory or memory internal to a processor to read or retrieve each data element before accessing external memory 735. The data elements may be arranged in cache memory 716, for example, in memory pages or other units of a memory. The data elements may be packed in memory (e.g., in contiguous memory locations 718 and 720) or alternately they may be stored in non-contiguous or non-adjacent locations (e.g., in non-contiguous memory locations 722 and 724). Typically the gather operation is used when the two or more of the data elements are stored in noncontiguous or non-adjacent memory locations 722 and 724. Data elements may be bytes (e.g., 8 bits), words (e.g., 2 bytes), double words (e.g., 32 bits) or other sizes or units of data.

The rate of a gather (or scatter) operation may depend, in part, on a level of coherence of the gathered (or scattered) elements. For example, the level of coherence of the gathered (or scattered) elements may be a measure of on how many different cache lines in which the data elements are stored, for example, in cache memory 716. Elements stored with greater coherence (e.g., stored using fewer cache lines in cache memory 716) may be gathered (or scattered) or retrieved (or stored) in less time or in fewer operational cycles. For example, when all the data elements are fully coherent (e.g., on the same cache line), the gather (or scatter) operation may retrieve (or store) the data in a single cycle, or at least a single cache access. However, gathered (or scattered) elements may not be fully coherent. For example, the elements may be dispersed on several (e.g., 2 or 3) cache lines, and therefore may be gathered (or scattered) in several (e.g., 2 or 3) accesses to (e.g., the level 1 (L1) or central processing unit (CPU)) cache memory 416.

In some embodiments of cache memory 716, cache lines in which the data elements are stored may comprise multiple banks or blocks, for example, eight or sixteen banks could each store 64-bits of data for a 64-byte or a 128-byte cache line respectively. Of course, each bank could store less (e.g. 32-bits) or more (128-bits) data, and each cache line could have less or more banks or blocks (e.g. 4, 12, 20, 32, 48, etc.). The rate of a gather (or scatter) operation may also depend, in part, on the degree to which the gathered (or scattered) elements are stored in non-conflicting banks of cache memory 716. For some embodiments of cache memory 716, multiple cache lines may be accessed at the same time. In particular, when data from two or more cache lines is stored in non-conflicting banks or blocks of cache memory 716, then the data elements from two or more cache lines may also be gathered or retrieved in less time or in fewer operational cycles. Thus, if all the data elements are either coherent (e.g., on the same cache line) and/or stored in non-conflicting banks, the gather operation may conceivably retrieve the data in a single cycle, or at least a single cache access.

It will be appreciated that communication of the individual data elements in the vector registers and completion masks to address generation logic, and to (or from) the memory access units without prescheduling multiple individual micro-operations for generating addresses for each of the individual data elements is a technical problem, which needs to be addressed. Therefore using an index array and finite state machine for scatter and/or gather operations without requiring the scheduling of numerous multiple individual micro-operations for generating addresses for each of the individual data elements in a vector register or for tracking the individual completion masks provides for a technical solution the this problem.

Destination register 715 may be a vector register, load register or other register memory for temporarily storing or packing data accessed or gathered from two or more non-adjacent memory locations. For example, for a set of data (e.g., 16 vectors), destination register 715 may be the destination of a gather operation and cache memory 716 and/or external memory 735 may be the sources (e.g., which may be contiguous 718 and 720 or non-contiguous 722 and 724).

In one embodiment, when a gather operation for gathering a predetermined set of data is terminated before completion, destination register 715 may temporarily store or preserve the data already collected (e.g., a partial subset of the predetermined set of data).

The gather operation may stop or interrupt for a variety of reasons. For example, a context switching device may switch register contexts, task contexts, or process contexts (e.g., for changing a state or context of a processor between two or more of multiple tasks). In another embodiment, the gather operation may stop or interrupt when one or more precise exceptions substantially impedes or slows down the gather operation (e.g., a maximal number or limit of allowable page faults or cache page misses for an operating system (OS) may be encountered) and/or the time allotted to the gather operation expires. In yet another embodiment, the gather operation may stop or interrupt when the gather operation is replaced by a higher priority operation.

A gather operation may be impeded, for example, when attempting to retrieve data from problematic memory locations in a system resulting in page faults. Some fault conditions such as page faults must be handled so that the program flow is capable of resuming the faulting instruction (e.g., retrieving the data) while guaranteeing forward progress of a corresponding set of instructions. In one embodiment, a memory page may include a fixed length block of cache memory 716 that is used as a unit of transfer between destination register 715 and other memories, such as, external memory 735, a hard-drive or disk. A page fault may include an interrupt (e.g., or an exception), for example, when a gather operation accesses a memory page that may be mapped in address space, but not physically loaded or available in cache memory 716. For example, each data element being gathered from cache memory 716 may cause a page fault and each element that crosses a boundary of a memory page may cause two page faults.

In one embodiment, a system may stop or interrupt the gather operation, for example, when a maximal number of allowable exceptions, such as, (e.g., 16) page faults are encountered. For example, the OS may have a limit for cache and/or page misses or faults for an operation. The OS may include exception handling software to handle the page faults and a processor may include a memory management unit for detecting page faults. Other exception handling mechanisms may be used.

In one embodiment, when a page fault is encountered, a system may stop the gather operation in the middle in order to handle the page fault. For example, if page faults are repeatedly encountered, the gather operation may be unable to progress. Conventionally, when the gather operation is stopped or interrupted, a partial subset of data elements already gathered may be lost and the process may rollback or return to the beginning of the gather operation.

Storing data gathered from cache memory 716 and/or external memory 735 in destination register 715 may preserve the data, for example, in case the complete gather operation (e.g., gathering all 16 vectors) is interrupted, fails or terminates before completion. According to embodiments of the invention, by storing data elements that have been gathered in destination register 715, the data previously collected by an interrupted or stopped gather operation may be preserved and the gather operation may restart in the middle. The interrupted gather operation (e.g., having gathered one or more data elements) may start from the middle, for example, gathering the remaining elements missing from destination register 715.

An efficient gather operation may be implemented in a system using a combination of software and/or hardware mechanisms. In one embodiment, a processor may execute a "gather_step" instruction repeatedly, for example, until a predetermined set of data has been completely gathered into destination vector register memory 715.

In some embodiments, mask register 710 may be implemented to monitor and/or control the gathering of a predetermined set of data elements and the packing of destination register 715 therewith. Mask register 710 may be a shadow register, a control register, a flag register or other appropriate register. Mask register 710 may track the completion of the gather operation by monitoring the data stored in destination register 715. In one embodiment, there is a one-to-one correspondence between data elements stored in destination register 715 and corresponding state elements stored in mask register 710. State elements or values may include flags, markers, tabs, indicators, signals, and or other numbers, bits and/or codes for indicating whether of not a corresponding data element (e.g., in a corresponding or pointed register location) is stored in destination register 715. For example, a "1" in mask register 710 may indicate that a corresponding data element was not written into destination register 715; otherwise a "0" may be used. Other numbers or flags may be used.

In one embodiment, a processor may call or execute the gather step instruction, for example, in a 'while' loop or repeating 'if' statement, until mask register 710 may be completely cleared (e.g., all state elements therein holding '0' values and the total value of mask register 710 may become zero), which may indicate that substantially all elements were successfully gathered from memory and loaded into destination register 715. In one embodiment, the gather step instruction may execute or run until the total value of the register state elements is zero.

Since a filled or packed destination register 715 of any size (e.g., for any number of gathered elements or instructions) may correspond to an empty or zero mask register 710 (e.g., regardless of the size of destination register 715), mask register 710 may be used to monitor the packing of any size destination register 715 (e.g., with any number of gathered elements). For example, the total sum of any number of "0" state elements will always be zero. Thus, mask register 710 may be used to monitor the packing or gathering of any, variable, and/or changing numbers of data elements into destination register 715. Other values may be used.

For example, in an alternate embodiment, a "1" in mask register 710 may indicate that a corresponding data element is written into destination register 415; otherwise a "0" may be used. In such embodiments, the gather instruction may execute until the sum of the values of the state elements in mask register 710 is equal to a predetermined threshold, for example, the number of data elements to be gathered, which may vary for each gather instruction.

In one embodiment, the gather step instruction may execute or run until a flag indicates that mask register 710 is cleared, zero, or another predetermined value (e.g., the number of elements to be gathered for the gather instruction). In one embodiment, a completion mask may signal or flag when the gather operation is complete.

In one embodiment, in each operation cycle, the "gather_step" instruction may read a different one of the cache lines from (e.g., L1) cache memory 716 and may fill a maximum number of elements in destination register 715 corresponding to the cache line read. For example, if the cache line read has one element to be gathered, then one element may be written into destination register 715 and the corresponding one bit state elements in mask register 710 may be set to "0". In some embodiments, when dual or multiple ported cache memory 716 and/or external memory 735 are used, a processor may scatter and/or gather more than one data element per cycle, in which case the scatter and/or gather operation for scattering and/or gathering a predetermined set of data elements may execute in fewer cycles or iterations.

The following pseudo-code includes demonstrative examples of operations described herein. Other pseudo-code, languages, operations, orders of operations, and/or numbers may be used.

The following pseudo-code illustrates an example of how a gather instruction (e.g., written 'vgatherd') may operate.

Define a vgatherd instruction as follows:

```
vgatherd vector_dest{mask}, vector_offset, [base_address]
vector_dest is a vector register containing the result
mask is a 16-bit mask register used to track the progress of the vector-
gather operation
base_address is the base memory address
vector_offset is a vector register that contains a vector of offsets from the
base_address
    // Initialize the array of addresses
    for(i=0; i < 16 ; i++)
    {
        memPtr[i] = base_address + vector_offset[i];
    }
    bool bFirst = 1;
    UINT64 BaseCacheLine = 0;
    for(i=0; i < 16 ; i++)
    {
        if (mask[i] == 1)
        {
            thisCacheLine = memPtr[i] & 0xffffffffffffffC0;
            if( bFirst || (BaseCacheLine == thisCacheLine ))
            {
                BaseCacheLine = thisCacheLine;
                bFirst = 0;
                vector_dest[i] =
                LOAD_FROM_MEMORY(memPtr[i]); // 32-bits
                // reset mask bit
                mask[i] = 0;
            }
        }
    }
```

The following assembly code illustrates an example of how to use an iterative gather-step instruction (vgatherd) to implement a full vector-gather function, according to one embodiment.

The (vkxnor k1, k2) instruction implements the following function:

```
k1 = k1 XNOR k2
The (vkortest k1, k2) instruction writes the integer flags as follows.
zero_flag = ((k1 OR k2) == 0) // is the "or" of k1 and k2 equal to zero
carry_flag = ((k1 OR k2) == 0xFFFF) // is the "or" of k1 and k2 equal to
all 1's
The "jnz" instruction is a standard x86 jump-if-not-zero branch.
;----------------------------------------------------------------------
; K1 = ffff;
    vkxnor k1, k1           ; init the completion mask
vg_loop:
    vgatherd v1{k1}, v2, [eax]       ; v1 = dest
        ; k1 = completion mask
        ; v2 = address offset vector
        ; eax = base address
    vkortest k1, k1
    jnz vg_loop
```

The following pseudo-code illustrates one embodiment of a scatter instruction (written here 'vscatterd').

Define a vscatterd instruction as follows:

```
vscatterd [base_address]{mask}, vector_offset, vector_scatter_data
base_address is the base memory address
mask is a 16-bit mask register used to track the progress of the vector-gather operation
vector_offset is a vector register that contains a vector of offsets from the base_address
vector_scatter_dest is a vector register containing the data to be scattered to memory
```

```
// Initialize the array of addresses
for(i=0; i < 16 ; i++)
{
    memPtr[i] = base_address + vector_offset[i];
}
bool bFirst = 1;
UINT64 BaseCacheLine = 0;
for(i=0; i < 16 ; i++)
{
    If (mask[i] == 1)
    {
        UINT64 thisCacheLine = memPtr[i] & 0xffffffffffffffC0;
        if( bFirst || (BaseCacheLine == thisCacheLine ))
        {
            BaseCacheLine = thisCacheLine;
            bFirst = 0;
            // Store to memory 32 bits of vector_scatter_data[i] to location memPtr[i]
            STORE_TO_MEMORY(memPtr[i],vector_scatter_data[i]);
            // reset mask bit
            mask[i] = 0;
        }
    }
}
```

The following assembly code illustrates one example an iterative scatter-step instruction (vscatterd) implementing a full vector-scatter function.

```
;----------------------------------------------------------------
vs_loop:
    vscatterd [eax]{k1}, v2, v3   ; v3 = vector of scatter data
        ; k1 = completion mask
        ; v2 = address offset vector
        ; eax = base address
    vkortest k7, k7
    jnz vs_loop
```

Referring again to FIG. 7, a scatter/gather prefetch instruction may be defined similarly to the vgatherd instruction, but instead of loading data into destination register 715, the cache line having the data may be prefetched into cache memory 716. In one embodiment, the data may first be prefetched into cache memory 716, for example, before being gathered, in order to avoid paying a cache miss penalty. Such an order of operations may be achieved, for example, by executing the following instruction:

vgatherpfd vector_offset{mask}, [base_address]
   mask may be a 16-bit mask register to track the progress of the vector-gather operation base_address may be the base memory address
   vector_offset may be a register that contains a vector of offsets from the base_address Following is one example or sample of pseudo-code for a prefetch loop:

```
The vgatherpfd may prefetch the data into the L1 cache each iteration.
; K1 = ffff;
    vkxnor k1, k1        ; init the completion mask
vpref_loop:
    ; prefetch the cacheline associated with the first non-gathered element
    vgatherpfd  v2{k1}, [eax]
    vkortest k1, k1
    jnz vpref_loop
```

Embodiments of the invention may include gather and/or scatter operations that use mask register 710 as a writemask (e.g., selecting the data elements on which to operate) and completion mask (e.g., signaling or flagging when the operation may be complete). In one embodiment, the writemask and/or vector completion mask may be (e.g., 16 bit) registers in a register file. Such embodiments may enable varied and/or flexible implementations on different architectures with varying levels of performance that may be customized for a target application. For example, some wide vector architectures may implement gather and/or scatter operations in which all elements are gathered and/or scattered in a single cycle. In other implementations may gather and/or scatter only one element per cycle. The order of instructions for executing the gather and/or scatter operations may affect the number of cycles used to access cache memory 716 to scatter and/or gather elements. Embodiments of the invention may use addresses that may be built using scaled index bias addressing, which may allow, for example, for 64-bit address generation from a vector having a 32-bit offsets. Compared with some conventional architectures, which use a vector of completely formed addresses, the scaled addressing may be generated using reduced programming overhead. Addressing modes may be formed using a (e.g., 64-bit) memory pointer using elements from two vector registers and/or neighboring elements in one vector register. Other or different memory pointing or addressing mechanisms may be used.

Embodiments of the invention may include gather and/or scatter operations that support a wide variety of data type conversions. Such support may be valuable when considering the spatial coherency of data and the total number of cache lookups used to complete a scatter and/or gather operation. Other or different benefits may be achieved.

Figure 8A:
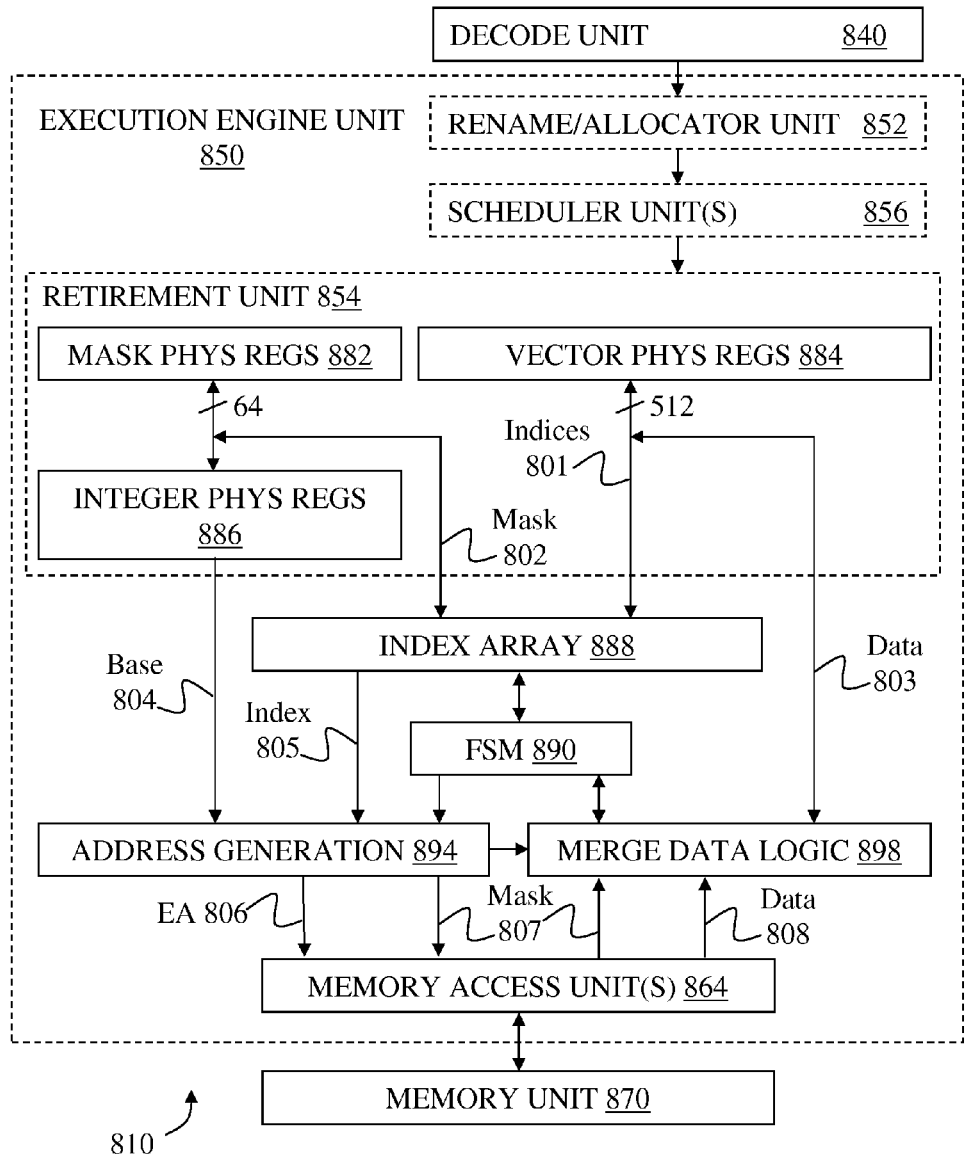
FIG. 8A illustrates one embodiment of an apparatus for using an index array and finite state machine responsive to, and/or in support of gather operations.

FIG. 8A illustrates one embodiment of an apparatus 810 for using an index array 888 and finite state machine 890 responsive to, and/or in support of gather operations. Apparatus 810 comprises a decode unit 840 to decode a gather instruction, an execution engine unit 850 and a memory unit 870. The decode unit 840 is coupled to a rename/allocator unit 852 in the execution engine unit 850. The execution engine unit 850 includes the rename/allocator unit 852 coupled to a retirement unit 854 and a set of one or more scheduler unit(s) 856. The scheduler unit(s) 856 represents any number of different schedulers, including reservations stations, central instruction window, etc. The scheduler unit(s) 856 is coupled to the physical register file(s) including vector physical registers 884, mask physical registers 882 and integer physical registers 886. Each of the physical register file(s) represents one or more physical register files, different ones of which store one or more different data types, such as scalar integer, scalar floating point, packed integer, packed floating point, vector integer, vector floating point, etc., status (e.g., an instruction pointer that is the address of the next instruction to be executed), etc.

Execution engine unit 850 of apparatus 810 comprises an index array 888 to store a set of indices 801 from a SIMD vector register of the vector physical registers 884 and a corresponding set of mask 802 elements from the mask physical registers 882. For one embodiment a wide vector store channel (e.g. 128-bit, or 256-bit, or 512-bit or larger) and a 64-bit integer-stack channel may be repurposed to facilitate a transfer of indices 801 and mask 802 elements to index array 888 (e.g. using a single micro-operation). Finite state machine 890 is operatively coupled with the index array 888 to facilitate a gather operation using the set of indices 801 and the corresponding mask 802 elements. Address generation logic 894 in response to finite state machine 890, generates an effective address 806 from at least a base address 804 provided by integer physical registers 886 and an index 805 of the set of indices 801 in the index array 888 for at least each corresponding mask 802 element having a first value. Memory access unit(s) 864 are operatively coupled with the address generation logic 894 to access a memory location, for a corresponding mask 807 element having a first value, through memory unit 870, the memory location corresponding to an effective address 806 generated by address generation logic 894 in response to finite state machine 890, to load a data element 808. Merge data logic 898 is operatively coupled with the memory access unit 864 and with a destination SIMD register of the vector physical registers 884, to write the data element 808 at an in-register position in the destination SIMD vector register according to a respective in-register position in the first SIMD vector register of an index element corresponding to the effective address 806 generated. For example, in one embodiment the data may be broadcast to all of the positions and an individual mask associated with the corresponding index could be used to change only a single in-register position. In alternate embodiments multiple in-register positions may be changed concurrently. In one embodiment, an individual mask 807 may be sent to a memory access unit 864 and returned with data 808 to merge data logic 898 to facilitate a masked blending of the data element. In another alternative embodiment a micro-operation may be generated to facilitate the merging of the data element. Finite state machine 890 then changes the corresponding mask 802 element from the first value to a second value upon successfully gathering the data element 808 from memory.

It will be appreciated that by scheduling just a few micro-operations to transfer a set of indices from SIMD vector registers 884 and a corresponding set of mask 802 elements to index array 888 and initialize finite state machine 890 to expand those few micro-operations to load the data, in parallel or concurrently with the execution of other instructions and responsive to, and/or in support of gather operations, instruction throughput may be improved.

Figure 8B:
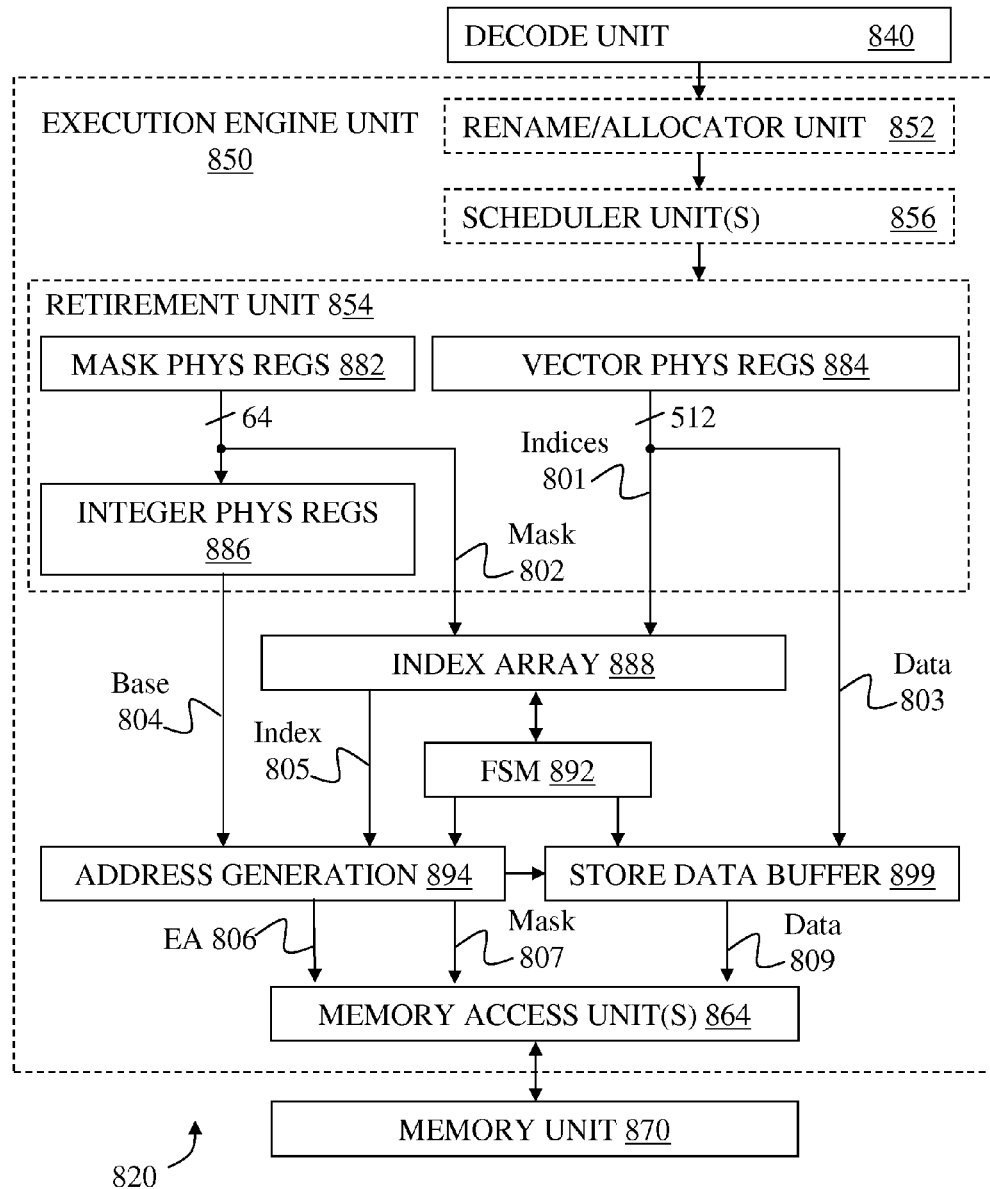
FIG. 8B illustrates one embodiment of an apparatus for using an index array and finite state machine responsive to, and/or in support of scatter operations.

FIG. 8B illustrates one embodiment of an apparatus 820 for using an index array 888 and finite state machine 892 responsive to, and/or in support of scatter operations. Apparatus 820 comprises a decode unit 840 to decode a scatter instruction, an execution engine unit 850 and a memory unit 870. Similar elements in FIG. 8B bear like reference numerals. The decode unit 840 is coupled to a rename/allocator unit 852 in the execution engine unit 850. The execution engine unit 850 includes the rename/allocator unit 852 coupled to a retirement unit 854 and a set of one or more scheduler unit(s) 856. The scheduler unit(s) 856 represents any number of different schedulers, including reservations stations, central instruction window, etc. The scheduler unit(s) 856 is coupled to the physical register file(s) including vector physical registers 884, mask physical registers 882 and integer physical registers 886. Each of the physical register file(s) represents one or more physical register files, different ones of which store one or more different data types, such as scalar integer, scalar floating point, packed integer, packed floating point, vector integer, vector floating point, etc., status (e.g., an instruction pointer that is the address of the next instruction to be executed), etc.

Execution engine unit 850 of apparatus 810 comprises an index array 888 to store a set of indices 801 from a SIMD vector register of the vector physical registers 884 and a corresponding set of mask 802 elements from the mask physical registers 882. For one embodiment a wide vector store channel (e.g. 128-bit, or 256-bit, or 512-bit or larger) and a 64-bit integer-stack channel may be repurposed to facilitate a transfer of indices 801 and mask 802 elements to index array 888 (e.g. using a single micro-operation). Some embodiments of execution engine unit 850 also comprise a store data buffer 899 wherein all of the data elements from a SIMD vector register for a scatter operation may be written into multiple individual element storage locations of the store data buffer 899 at one time (e.g. using a single micro-operation). It will be appreciated that data elements stored in these multiple individual storage locations of the store data buffer 899 may then be forwarded to satisfy newer load operations without accessing external memory. Finite state machine 892 is operatively coupled with the index array 888 to facilitate a scatter operation using the set of indices 801 and the corresponding mask 802 elements.

Address generation logic 894 in response to finite state machine 892, generates an effective address 806 from at least a base address 804 provided by integer physical registers 886 and an index 805 of the set of indices 801 in the index array 888 for at least each corresponding mask 802 element having a first value. Storage is allocated in store data buffer 899 to hold the data 803 elements corresponding to the generated effective addresses 806 for storing to corresponding memory locations by the memory access unit(s) 864. Data 803 elements corresponding to the effective addresses 806 being generated are copied to the buffer store data buffer 899. Memory access unit(s) 864 are operatively coupled with the address generation logic 894 to access a memory location, for a corresponding mask 807 element having a first value, through memory unit 870, the memory location corresponding to an effective address 806 generated by address generation logic 894 in response to finite state machine 892, to store a data element 809. In one embodiment, the data 803 elements stored in store data buffer 899 may be accessed to satisfy newer load instructions out of sequential instruction order if their effective addresses 806 correspond to the effective addresses of the newer load instructions. Finite state machine 892 then changes the corresponding mask 802 element from the first value to a second value upon successfully scattering the data element 809 to memory. In some embodiments successful completion of the scatter operation may be accomplished through the execution of a micro-operation. In some embodiments such a micro-operation may be retired upon successful completion (e.g. without faulting) of the corresponding stores by the finite state machine 892.

It will be appreciated that in some embodiments, determinations may be made whether the data 803 elements stored in store data buffer 899 may eventually be used to satisfy newer load instructions out of sequential instruction order as early as the storage is allocated in store data buffer 899 corresponding to the generated effective addresses 806. It will also be appreciated that by scheduling just a few micro-operations to transfer a set of indices 801 from a SIMD vector register of the vector physical registers 884 and a corresponding set of mask 802 elements from the mask physical registers 882 to index array 888 and initialize finite state machine 892 to expand those few micro-operations to store the data, in parallel or concurrently with the execution of other instructions and responsive to, and/or in support of scatter operations, instruction throughput may be improved.

Figure 9:
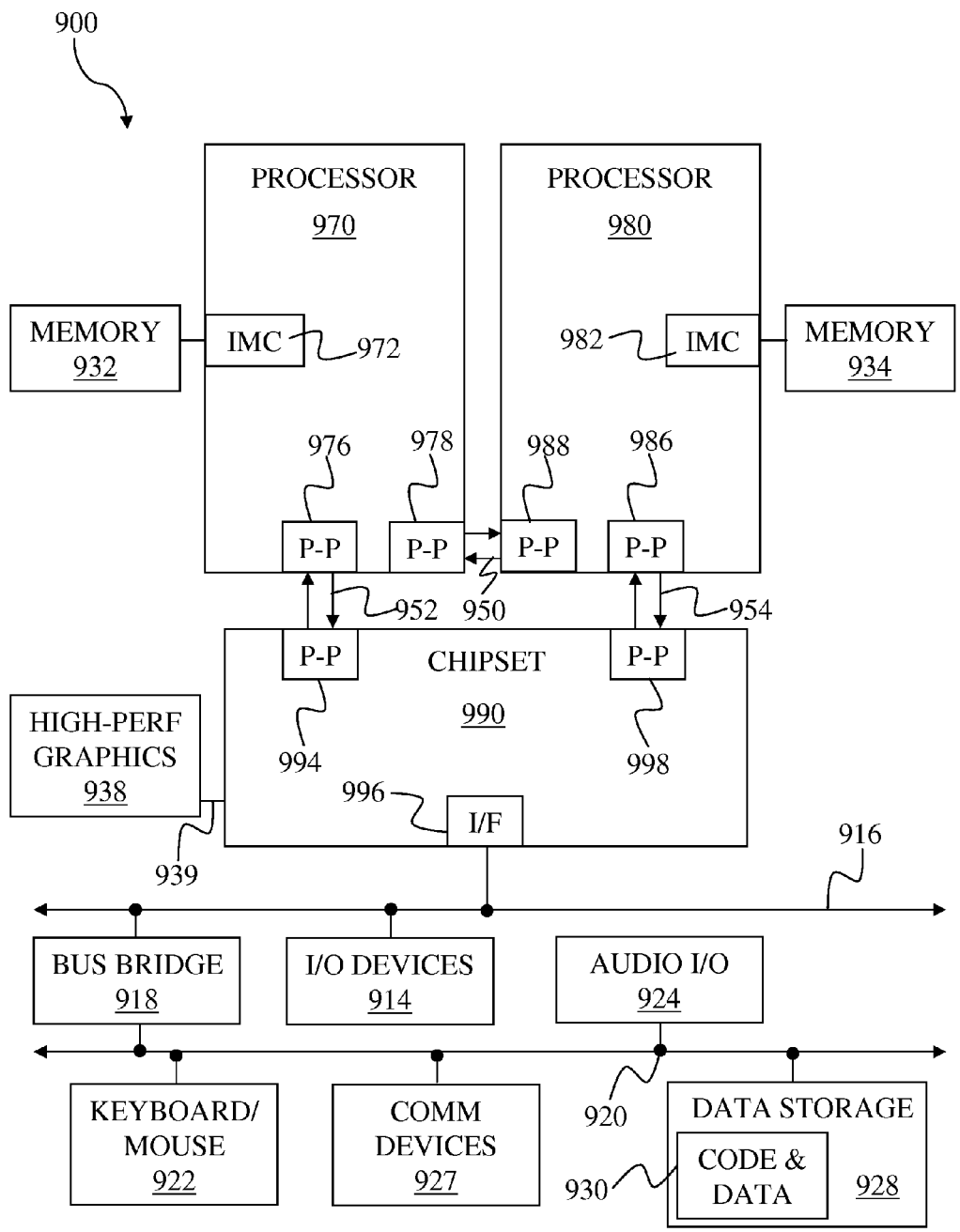
FIG. 9 is a block diagram of an embodiment of a system to execute instructions that provide vector scatter and/or gather functionality.

Referring now to FIG. 9, shown is a block diagram of a system 900 in accordance with an embodiment of the present invention. As shown in FIG. 9, multiprocessor system 900 is a point-to-point interconnect system, and includes a first processor 970 and a second processor 980 coupled via a point-to-point interconnect 950.

While shown with only two processors 970, 980, it is to be understood that the scope of the present invention is not so limited. In other embodiments, one or more additional processors may be present in a given processor.

Processors 970 and 980 are shown including integrated memory controller units 972 and 982, respectively. Processor 970 also includes as part of its bus controller units point-to-point (P-P) interfaces 976 and 978; similarly, second processor 980 includes P-P interfaces 986 and 988. Processors 970, 980 may exchange information via a point-to-point (P-P) interface 950 using P-P interface circuits 978, 988. As shown in FIG. 9, IMCs 972 and 982 couple the processors to respective memories, namely a memory 932 and a memory 934, which may be portions of main memory locally attached to the respective processors.

Processors 970, 980 may each exchange information with a chipset 990 via individual P-P interfaces 952, 954 using point to point interface circuits 976, 994, 986, 998. Chipset 990 may also exchange information with a high-performance graphics circuit 938 via a high-performance graphics interface 939.

A shared cache (not shown) may be included in either processor or outside of both processors, yet connected with the processors via P-P interconnect, such that either or both processors' local cache information may be stored in the shared cache if a processor is placed into a low power mode.

Chipset 990 may be coupled to a first bus 916 via an interface 996. In one embodiment, first bus 916 may be a Peripheral Component Interconnect (PCI) bus, or a bus such as a PCI Express bus or another third generation 110 interconnect bus, although the scope of the present invention is not so limited.

As shown in FIG. 9, various 110 devices 914 may be coupled to first bus 916, along with a bus bridge 918 which couples first bus 916 to a second bus 920. In one embodiment, second bus 920 may be a low pin count (LPC) bus. Various devices may be coupled to second bus 920 including, for example, a keyboard and/or mouse 922, communication devices 927 and a storage unit 928 such as a disk drive or other mass storage device which may include instructions/code and data 930, in one embodiment. Further, an audio I/O 924 may be coupled to second bus 920. Note that other architectures are possible. For example, instead of the point-to-point architecture of FIG. 9, a system may implement a multi-drop bus or other such architecture.

Figure 10:
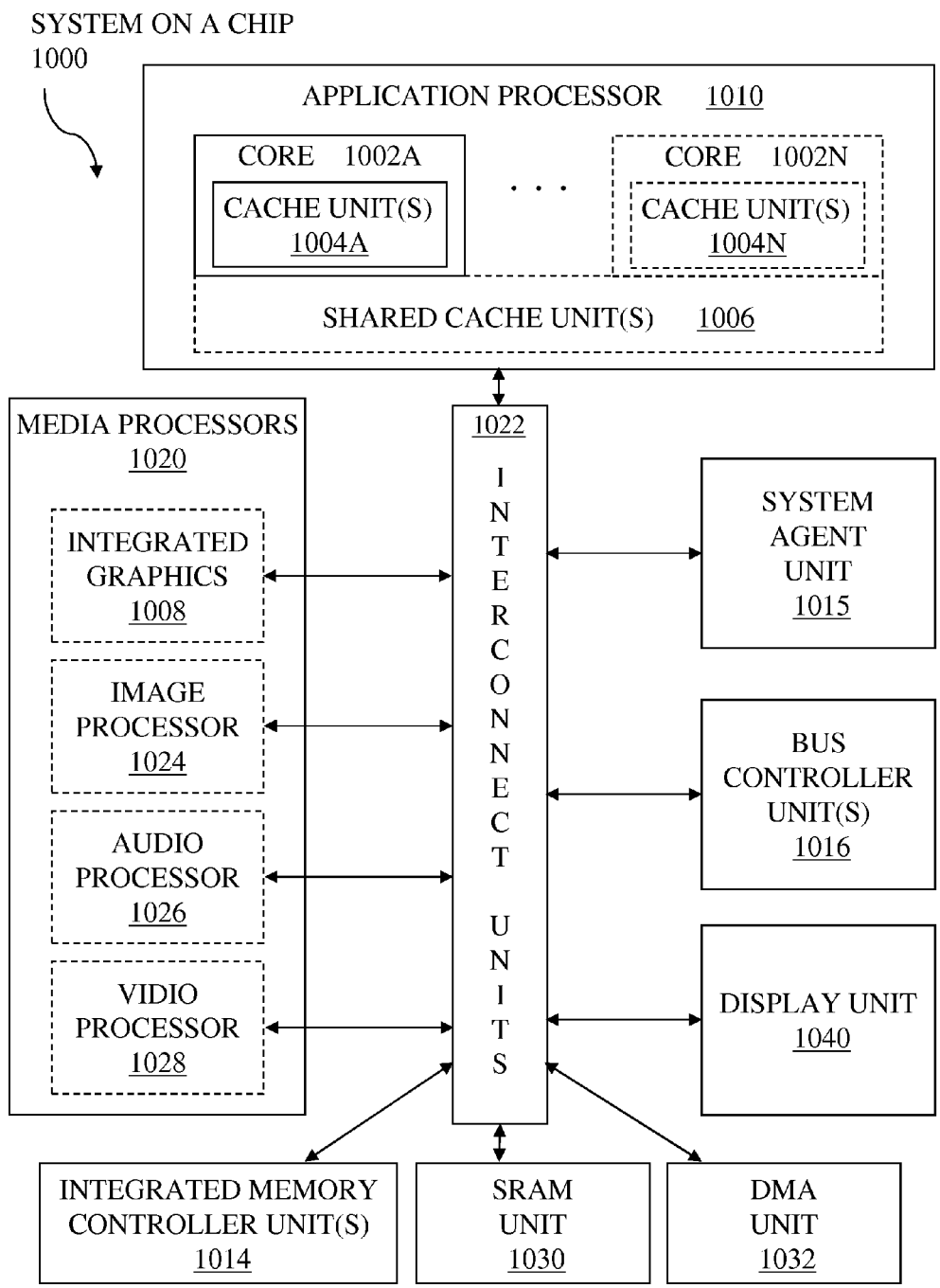
FIG. 10 is a block diagram of one embodiment of a system-on-a-chip to execute instructions that provide vector scatter and/or gather functionality.

Referring now to FIG. 10, shown is a block diagram of a SoC 1000 in accordance with an embodiment of the present invention. Dashed lined boxes are optional features on more advanced SoCs. In FIG. 10, an interconnect unit(s) 1022 is coupled to: an application processor 1010 which includes a set of one or more cores 1002A-N, each having cache units 1004A-N respectively, and a shared cache unit(s) 1006; a system agent unit 1015; a bus controller unit(s) 1016; an integrated memory controller unit(s) 1014; a set of one or more media processors 1020 which may include integrated graphics logic 1008, an image processor 1024 for providing still and/or video camera functionality, an audio processor 1026 for providing hardware audio acceleration, and a video processor 1028 for providing video encode/decode acceleration; an static random access memory (SRAM) unit 1030; a direct memory access (DMA) unit 1032; and a display unit 1040 for coupling to one or more external displays.

Figure 11:
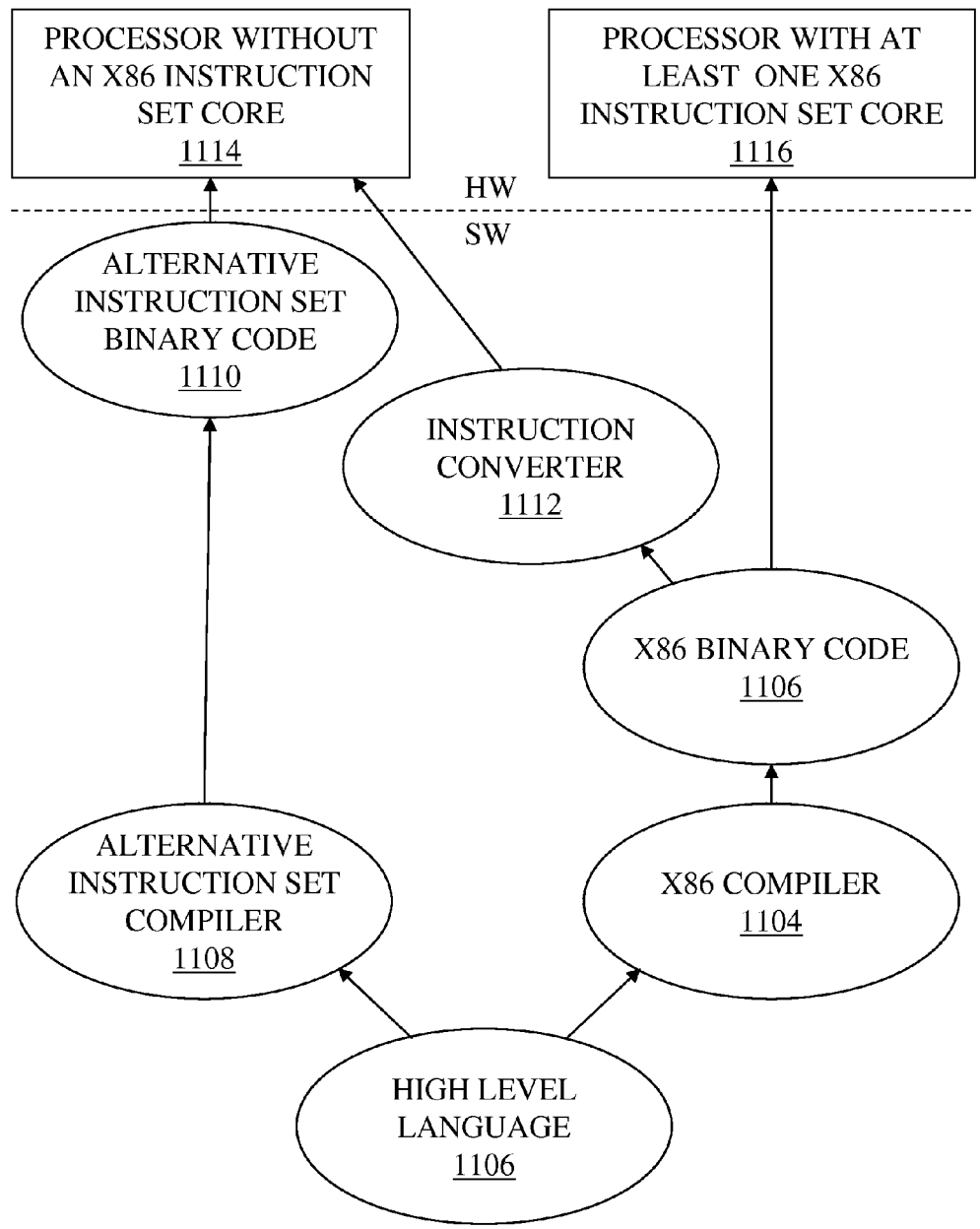
FIG. 11 illustrates one embodiment of a system to translate instructions that provide vector scatter and/or gather functionality.

FIG. 11 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 11 shows a program in a high level language 1102 may be compiled using an x86 compiler 1104 to generate x86 binary code 1106 that may be natively executed by a processor with at least one x86 instruction set core 1116. The processor with at least one x86 instruction set core 1116 represents any processor that can perform substantially the same functions as a Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 1104 represents a compiler that is operable to generate x86 binary code 1106 (e.g., object code) that can, with or without additional linkage processing, be executed on the processor with at least one x86 instruction set core 1116. Similarly, FIG. 11 shows the program in the high level language 1102 may be compiled using an alternative instruction set compiler 1108 to generate alternative instruction set binary code 1110 that may be natively executed by a processor without at least one x86 instruction set core 1114 (e.g., a processor with cores that execute the MIPS instruction set of MIPS Technologies of Sunnyvale, Calif. and/or that execute the ARM instruction set of ARM Holdings of Sunnyvale, Calif.). The instruction converter 1112 is used to convert the x86 binary code 1106 into code that may be natively executed by the processor without an x86 instruction set core 1114. This converted code is not likely to be the same as the alternative instruction set binary code 1110 because an instruction converter capable of this is difficult to make; however, the converted code will accomplish the general operation and be made up of instructions from the alternative instruction set. Thus, the instruction converter 1112 represents software, firmware, hardware, or a combination thereof that, through emulation, simulation or any other process, allows a processor or other electronic device that does not have an x86 instruction set processor or core to execute the x86 binary code 1106.

Figure 12:
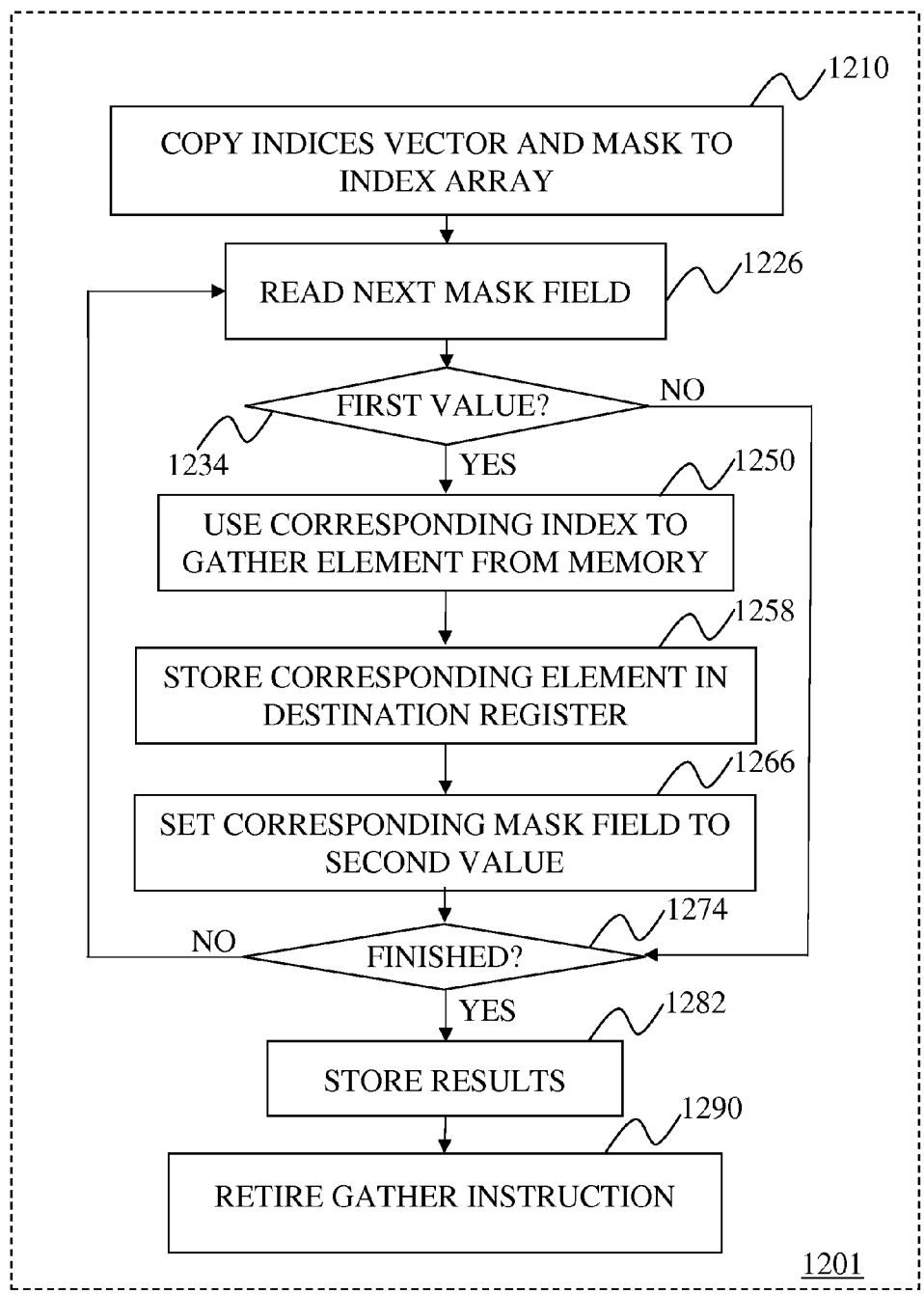
FIG. 12 illustrates a flow diagram for one embodiment of a process to support gather operations.

FIG. 12 illustrates a flow diagram for one embodiment of a process 1201 to provide vector gather functionality. Process 1201 and other processes herein disclosed are performed by processing blocks that may comprise dedicated hardware or software or firmware operation codes executable by general purpose machines or by special purpose machines or by a combination of both.

In processing block 1210 of process 1201, the indices are copied from a vector operand register and corresponding mask elements from a mask register into an index array. Processing then proceeds to processing block 1226 where a next value is read from each field of a plurality of mask fields in a mask register. It will be appreciated that while the process 1201 is illustrated as being iterative, it may be preferable to perform many of the operations in parallel when possible. Each of the plurality of mask fields from the mask register may correspond to an offset for a data element in a memory, and for each field in the mask register, one value indicates the corresponding element has not been gathered from the memory and a second value indicates that the corresponding data element does not need to be gathered, or has already been gathered from the memory. In one embodiment the mask register is an architecturally visible register. In another embodiment the mask register may be implicit, for example with all fields initially indicating that the corresponding element has not been gathered from the memory. In processing block 1234, the fields of the mask register are compared to the first value indicating that the corresponding element has not been gathered from the memory. If it is not equal to the first value, processing proceeds to processing block 1274 where the gathering operation reiterates until finished. In some embodiments, additional processing may also be performed (e.g. saving the value of a mask field for merging of gathered data) even if the field of the mask register is not equal to the first value, but such processing is not essential to other embodiments of the invention. Otherwise in processing block 1250 the corresponding data element is gathered from the memory, and in processing block 1258, stored into a vector register having a plurality of data fields, a portion of which to store the gathered data elements. Upon successful completion of processing block 1258, the corresponding mask field is changed in processing block 1266 to the second value indicating that the corresponding data element has already been gathered from the memory.

In processing block 1274, a determination is made whether the gathering operation is finished (i.e. each field of the plurality of mask fields in the mask register has the second value). If not processing reiterates starting in processing block 1226. Otherwise processing proceeds to processing block 1282 where the results are stored, for example the results of a SIMD gather instruction may be stored in a physical vector register and the resulting mask fields may be stored in a physical mask register. Then in processing block 1290 the SIMD gather instruction is retired.

Figure 13:
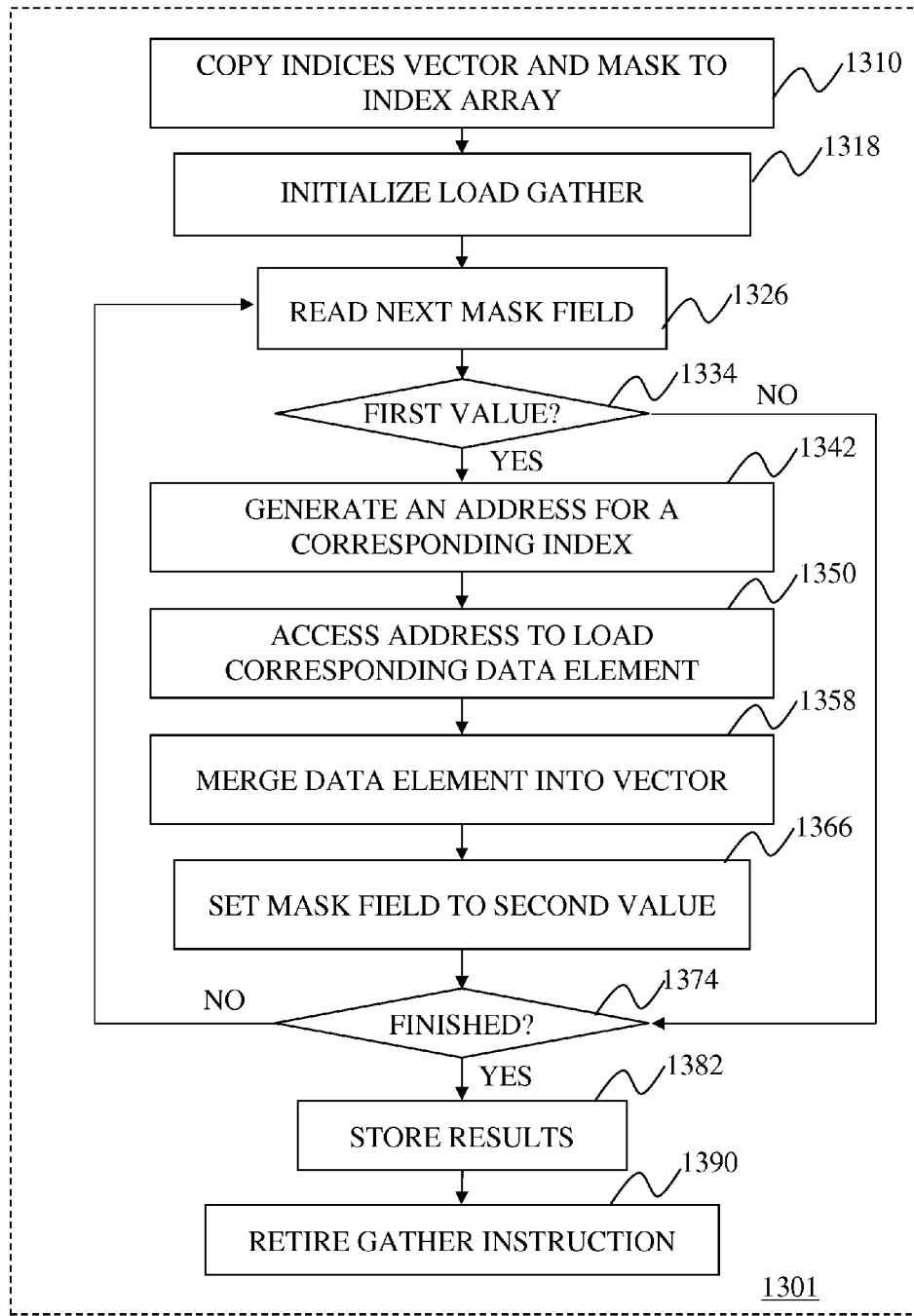
FIG. 13 illustrates a flow diagram for an alternative embodiment of a process to support gather operations.

FIG. 13 illustrates a flow diagram for another embodiment of a process 1301 to provide vector gather functionality. In processing block 1310 of process 1301 the indices are copied from a vector operand register and corresponding mask elements from a mask register into an index array. Processing then proceeds to processing block 1318 where a finite state machine is initialized to perform a load gather operation. Processing then proceeds to processing block 1326 where a next value is read from each field of a plurality of mask fields in a mask register. It will be appreciated that while the process 1301 is illustrated as being iterative, it may be preferable to perform many of the operations in parallel when possible. Each of the plurality of mask fields from the mask register may correspond to an offset for a data element in a memory, and for each field in the mask register, one value indicates the corresponding element has not been gathered from the memory and a second value indicates that the corresponding data element does not need to be gathered, or has already been gathered from the memory.

In one embodiment the mask register is an architecturally visible register. In another embodiment the mask register may be implicit, for example with all fields initially indicating that the corresponding element has not been gathered from the memory. In some embodiments the processor may assign values to elements in a mask register, which may in some cases monitor the storage capacity of a second register. In some embodiments, each element in the mask register may correspond to a respective one of the data elements to be written into the second (e.g., load) register. There may be a one-to-one correspondence between active data fields in the mask register and data elements in the second register. For example, there may be just two, or four, or eight, or sixteen, etc. active data fields in a mask register of 32, or 64, or 128 potential data fields. A second value may indicate that the corresponding data element has been written into the second register and a first value may indicate that the corresponding element has not been written into the second register. The second value may be zero (0) and the first value may be one (1). In another embodiment, the second value may be one (1) and the first value may be zero (0). Other or different values may also be used.

Thus, in some embodiments, each zero (e.g. second value) of an element (e.g., a state element) in a mask register may indicate that the corresponding data element has been written to a load register and each nonzero (e.g. first value) of the state element in the mask register may indicate that the corresponding data element has not yet been written to the load register. Accordingly, in processing block 1334, the fields of the mask register are compared to the first value indicating that the corresponding element has not been gathered from the memory. If it is not equal to the first value, processing proceeds to processing block 1374 where the gathering operation reiterates until finished. Otherwise in processing block 1342 the corresponding index is used to generate an effective address, and processing then proceeds to processing block 1350 where a data element is access at the effective address to load the corresponding data element from a memory (e.g. potentially a cache memory). Thus the corresponding data element is gathered from the memory, and in processing block 1358, it is stored or merged into a vector register having a plurality of data fields, a portion of which to store the gathered data elements. It will again be appreciated that while the process 1301 is illustrated as being iterative and sequential, for example processing blocks 1342, 1350 and 1358, it may be preferable to perform multiple operations of processing blocks 1342, 1350 or 1358, in parallel when possible. Upon successful completion of processing block(s) 1358, the corresponding mask field or fields are changed in processing block 1366 to the second value indicating that the corresponding data element has already been gathered from the memory.

In processing block 1374, a determination is made whether the gathering operation is finished (i.e. each field of the plurality of mask fields in the mask register has the second value). If not processing reiterates starting in processing block 1326. Otherwise processing proceeds to processing block 1382 where the results are stored, for example the results of a SIMD gather instruction may be stored in a physical vector register and the resulting mask fields may be stored in a physical mask register. Then in processing block 1390 the SIMD gather instruction is retired.

Figure 14:
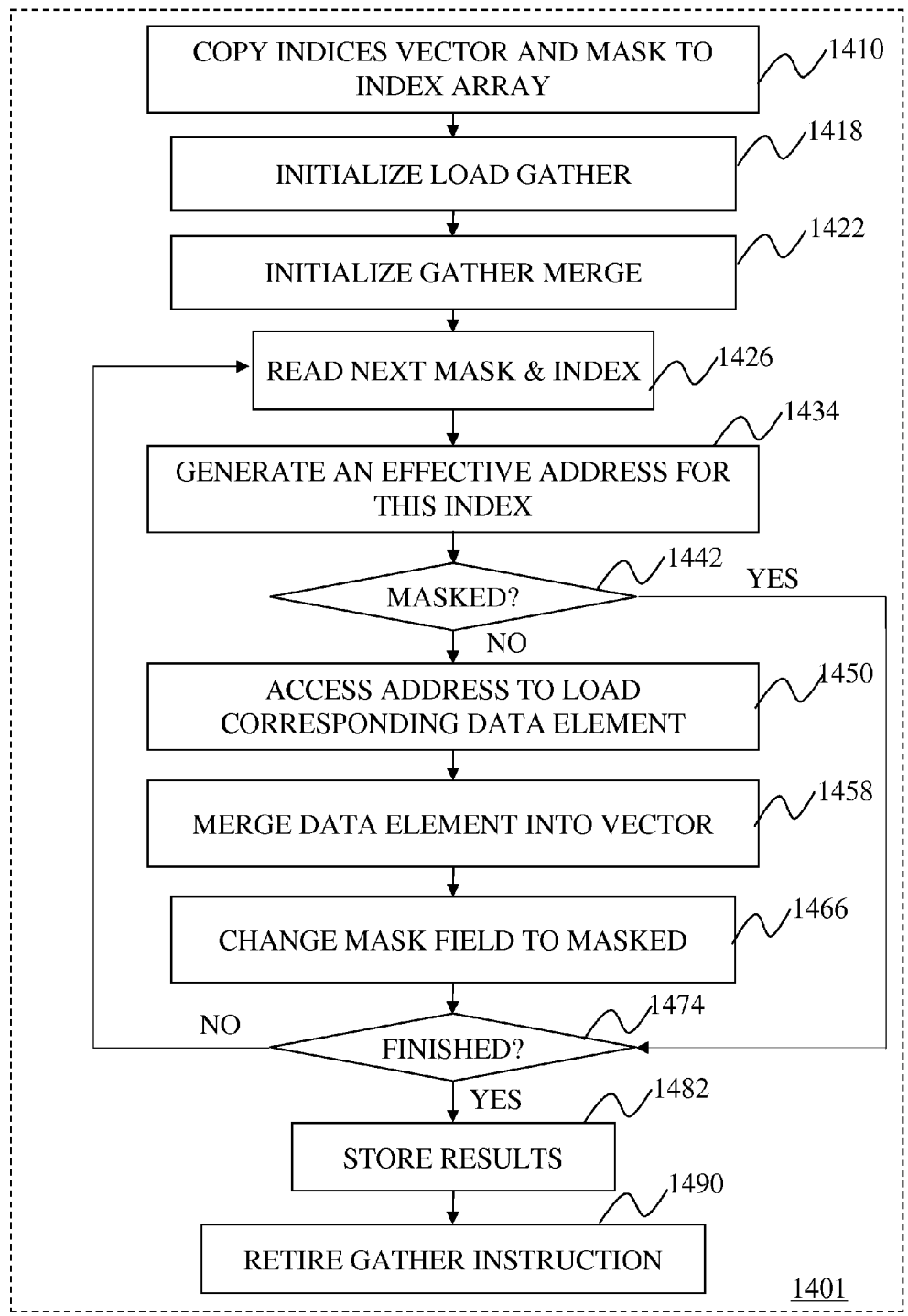
FIG. 14 illustrates a flow diagram for another alternative embodiment of a process to support gather operations.

FIG. 14 illustrates a flow diagram for another embodiment of a process 1401 to provide vector gather functionality. In processing block 1410 of process 1401 the indices are copied from a vector operand register and corresponding mask elements from a mask register into an index array. Processing then proceeds to processing block 1418 where a finite state machine is initialized to perform a load gather operation, and in processing block 1422 where merge logic is initialized to perform a gather merge operation. Processing then proceeds to processing block 1426 where a next value is read from each field of a plurality of mask fields in a mask register and from each index of a plurality of indices. In processing block 1434 an effective address is generated from the corresponding index. Each of the plurality of mask fields from the mask register may correspond to an offset for a data element in a memory, and for each field in the mask register, one value indicates the corresponding element has not been gathered from the memory and a second value indicates that the corresponding data element does not need to be gathered, or has already been gathered from the memory.

In one embodiment the mask register is an architecturally visible register. In another embodiment the mask register may be implicit, for example with all fields initially indicating that the corresponding element has not been gathered from the memory. There may be a one-to-one correspondence between active data fields in the mask register and data elements in the second register. For example, there may be just two, or four, or eight, or sixteen, etc. active data fields in a mask register of 32, or 64, or 128 potential data fields. A second value may indicate that the corresponding data element has been written into the second register and a first value may indicate that the corresponding element has not been written into the second register. Accordingly, in processing block 1442, the fields of the mask register are compared to the first value indicating that the corresponding element has not been gathered from the memory. If it is not equal to the first value, processing proceeds to processing block 1474 where the gathering operation reiterates until finished. Otherwise in processing block 1450 a data element is access at the effective address to load the corresponding data element from a memory (e.g. potentially a cache memory). Thus the corresponding data element is gathered from the memory, and in processing block 1458, it is stored or merged into a vector register having a plurality of data fields, a portion of which to store the gathered data elements. It will again be appreciated that while the process 1401 is illustrated as being iterative and sequential, for example processing blocks 1426, 1434, 1442, 1450 and 1458, it may be preferable to perform multiple operations of processing blocks 1426, 1434, 1442, 1450 and 1458, in parallel when possible. Upon successful completion of processing block(s) 1458, the corresponding mask field or fields are changed in processing block 1466 to the second value indicating that the corresponding data element has already been gathered from the memory.

In processing block 1474, a determination is made whether the gathering operation is finished (i.e. each field of the plurality of mask fields in the mask register has the second value). If not processing reiterates starting in processing block 1426. Otherwise processing proceeds to processing block 1482 where the results are stored, for example the results of a SIMD gather instruction may be stored in a physical vector register and the resulting mask fields may be stored in a physical mask register. Then in processing block 1490 the SIMD gather instruction is retired.

It will be appreciated that in the processes 1201, 1301 and/or 1401 to provide vector gather functionality, data merge logic (e.g. data merge logic 898) may be operatively coupled with a memory access unit (e.g. memory access unit 864) and with a SIMD vector register to write corresponding data elements at in-register positions according to respective positions of their corresponding masks (e.g. mask 802) and indices (e.g. indices 801). For example, in one embodiment the data (e.g. data 808) may be broadcast to all of the positions and an individual corresponding mask (e.g. mask 807) could be used to change only a single position. In alternate embodiments multiple positions may be changed concurrently. An FSM (e.g. FSM 890) changes the corresponding mask elements (e.g. of mask 802 in index array 888) upon successful completion of a corresponding load.

It will be appreciated that by scheduling just a few micro-operations to transfer a set of indices (e.g. indices 801) from a SIMD vector register (e.g. of vector physical registers 884) and a corresponding set of mask elements (e.g. mask 802) to an index array (e.g. index array 888) and initialize a finite state machine (e.g. FSM 890) to expand those few micro-operations (e.g. into the operations of processing blocks, 1326, 1334, 1342, 1350 and 1358, or into the operations of processing blocks 1426, 1434, 1442, 1450 and 1458) to load and gather the data, in parallel or concurrently with the execution of other instructions and responsive to, and/or in support of gather operations, instruction throughput may be improved.

Figure 15:
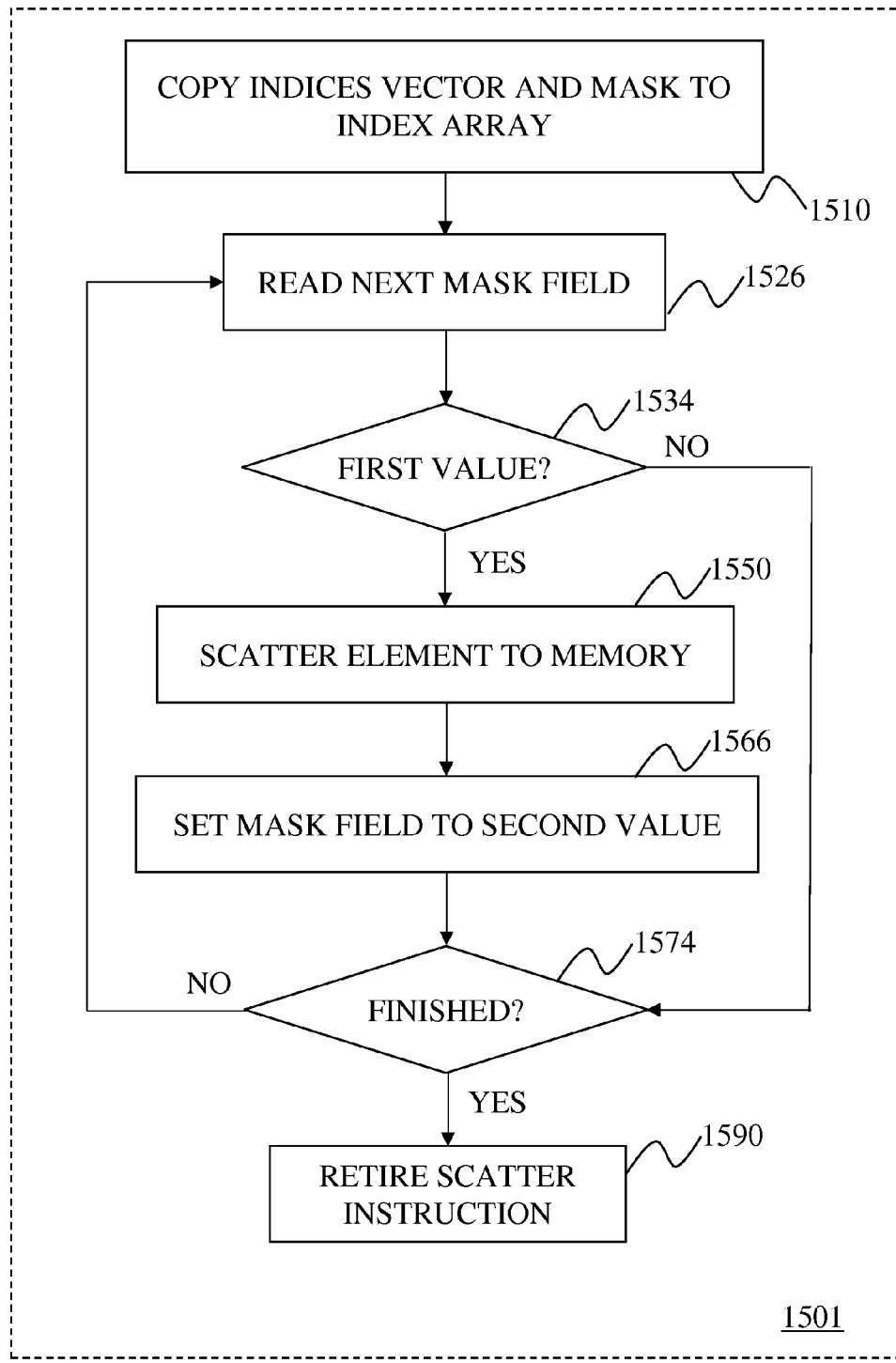
FIG. 15 illustrates a flow diagram for one embodiment of a process to support scatter operations.

FIG. 15 illustrates a flow diagram for one embodiment of a process 1501 to provide vector scatter functionality. In processing block 1510 of process 1501, the indices are copied from a vector operand register and corresponding mask elements from a mask register into an index array. Processing then proceeds to processing block 1526 where a next value is read from a field of a plurality of mask fields in the index array. It will be appreciated that while the process 1501 is illustrated as being iterative, it may be preferable to perform many of the operations in parallel when possible. Each of the plurality of mask fields from the mask register may correspond to an offset for a data element in a memory, and for each mask field, one value indicates the corresponding element has not been scattered to the memory and a second value indicates that the corresponding data element does not need to be scattered, or has already been scattered to the memory. In one embodiment the mask register is an architecturally visible register. In another embodiment the mask register may be implicit, for example with all fields initially indicating that the corresponding element has not been scattered to the memory. In processing block 1534, the fields of the mask register are compared to the first value indicating that the corresponding element has not been scattered to the memory. If it is not equal to the first value, processing proceeds to processing block 1574 where the scattering operation reiterates until finished. Otherwise in processing block 1550 the corresponding data element is scattered to the memory. Upon successful completion of processing block 1550, the corresponding mask field is changed in processing block 1566 to the second value indicating that the corresponding data element has already been scattered to the memory.

In processing block 1574, a determination is made whether the scattering operation is finished (i.e. each field of the plurality of mask fields in the mask register has the second value). If not processing reiterates starting in processing block 1526. Otherwise processing proceeds to processing block 1590 where the SIMD scatter instruction is retired and any changes to the mask register are made architecturally visible.

Figure 16:
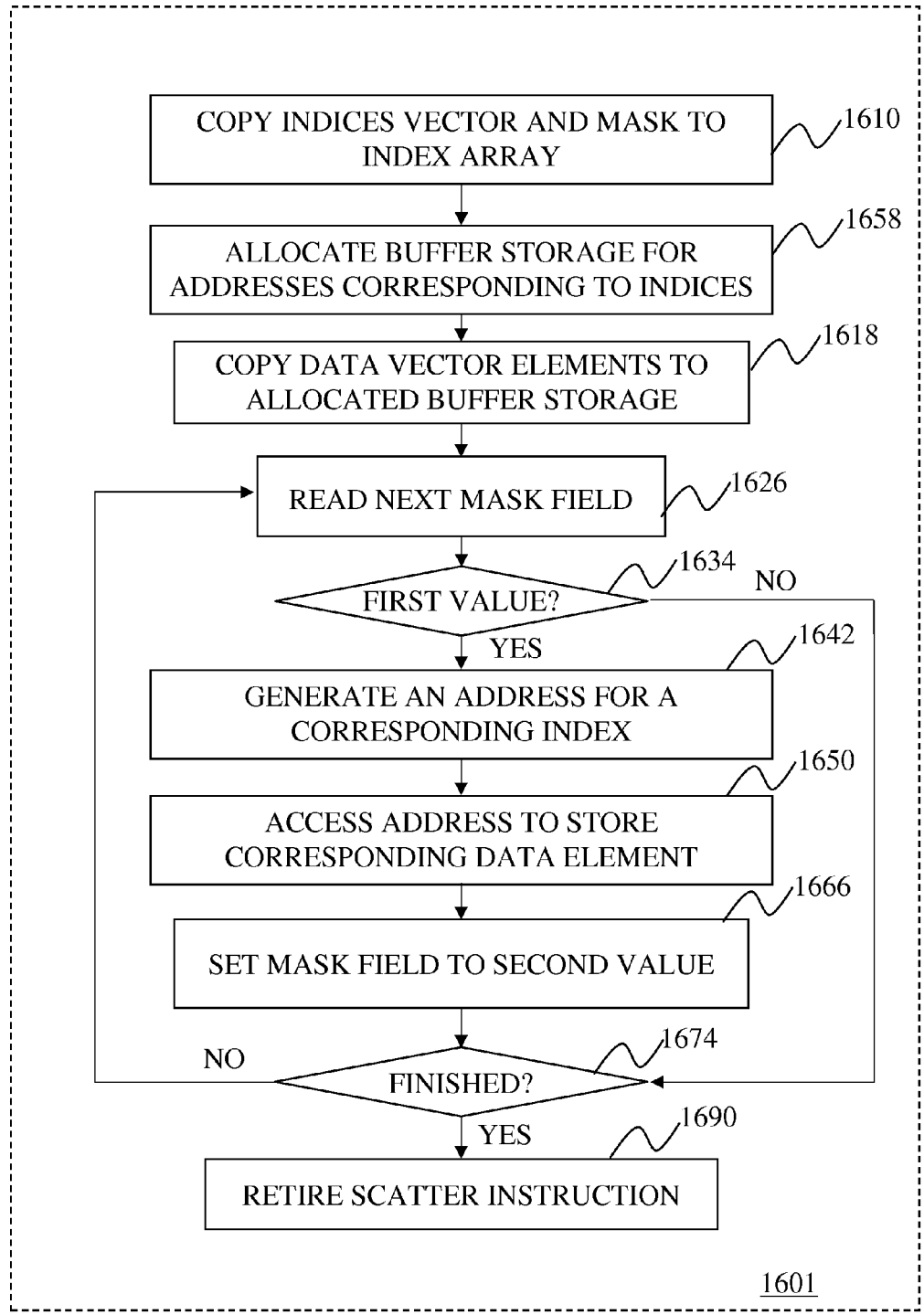
FIG. 16 illustrates a flow diagram for an alternative embodiment of a process to support scatter operations.

FIG. 16 illustrates a flow diagram for an alternative embodiment 1601 of a process to support scatter operations. In processing block 1610 of process 1601, the indices are copied from a vector operand register and corresponding mask elements from a mask register into an index array. Processing then proceeds to processing block 1658 where a finite state machine is initialized to perform a store scatter operation, and buffer storage is allocated for addresses corresponding to the indices. In processing block 1618, data vector elements are copied into the allocated storage. Processing then proceeds to processing block 1626 where a next value is read from a field of a plurality of mask fields in the index array. It will be appreciated that while the process 1601 is illustrated as being iterative, it may be preferable to perform many of the operations in parallel when possible. Each of the plurality of mask fields from the mask register may correspond to an offset for a data element in a memory, and for each mask field, one value indicates the corresponding element has not been scattered to the memory and a second value indicates that the corresponding data element does not need to be scattered, or has already been scattered to the memory.

In one embodiment the mask register is an architecturally visible register. In another embodiment the mask register may be implicit, for example with all fields initially indicating that the corresponding element has not been scattered to the memory. In some embodiments the processor may assign values to elements in a mask register, which may in some cases monitor the storage progress from a second register. In some embodiments, each element in the mask register may correspond to a respective one of the data elements to be stored from the second (e.g., store-data) register. There may be a one-to-one correspondence between active data fields in the mask register and data elements in the second register. For example, there may be just two, or four, or eight, or sixteen, etc. active data fields in a mask register of 32, or 64, or 128 potential data fields. A second value may indicate that the corresponding data element from the second register has been stored to memory and a first value may indicate that the corresponding element from the second register has not been stored in memory. The second value may be zero (0) and the first value may be one (1). In another embodiment, the second value may be one (1) and the first value may be zero (0). Other or different values may also be used.

Thus, in some embodiments, each zero (e.g. second value) of an element (e.g., a state element) in a mask register may indicate that the corresponding data element from a store-data register has been written or scattered to memory and each nonzero (e.g. first value) of the state element in the mask register may indicate that the corresponding data element from the store-data register has not yet been written to memory. Accordingly, in processing block 1634, the fields of the mask register are compared to the first value indicating that the corresponding element has not been scattered to the memory. If it is not equal to the first value, processing proceeds to processing block 1674 where the scattering operation reiterates until finished. Otherwise in processing block 1642 an effective address is generated from the corresponding index, and then in processing block 1650 the corresponding data element is scattered to the memory. It will again be appreciated that while the process 1601 is illustrated as being iterative and sequential, for example processing blocks 1642 and 1650, it may be preferable to perform multiple operations of processing blocks 1642 and 1650, in parallel when possible. Upon successful completion of processing block(s) 1650, the corresponding mask field or fields are changed in processing block 1666 to the second value indicating that the corresponding data element has already been scattered to the memory.

In processing block 1674, a determination is made whether the scattering operation is finished (i.e. each field of the plurality of mask fields in the mask register has the second value). If not processing reiterates starting in processing block 1626. Otherwise processing proceeds to processing block 1690 where the SIMD scatter instruction is retired and any changes to the mask register are made architecturally visible.

Figure 17:
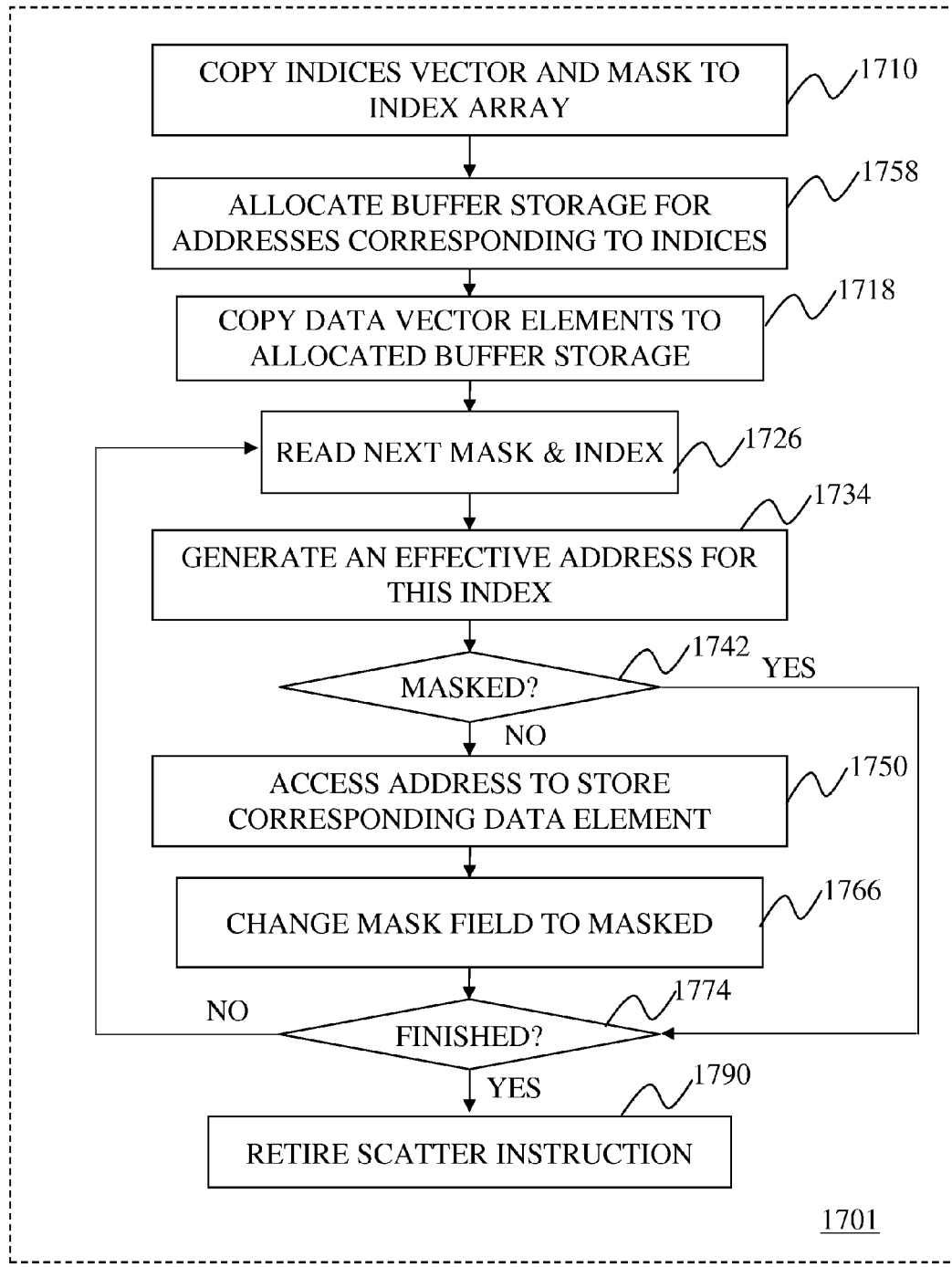
FIG. 17 illustrates a flow diagram for another alternative embodiment of a process to support scatter operations.

FIG. 17 illustrates a flow diagram for an alternative embodiment 1701 of a process to support scatter operations. In processing block 1710 of process 1701, the indices are copied from a vector operand register and corresponding mask elements from a mask register into an index array. Processing then proceeds to processing block 1758 where a finite state machine is initialized to perform a store scatter operation, and buffer storage is allocated for addresses corresponding to the indices. In processing block 1718, data vector elements are copied into the allocated storage. Processing then proceeds to processing block 1726 where a next value is read from a field of a plurality of mask fields in the index array, and in processing block 1734 an effective address is generated from the corresponding index. Each of the plurality of mask fields from the mask register may correspond to an offset for a data element in a memory, and for each mask field, one value indicates the corresponding element has not been scattered to the memory and a second value indicates that the corresponding data element does not need to be scattered, or has already been scattered to the memory. In one embodiment the mask register is an architecturally visible register. In another embodiment the mask register may be implicit, for example with all fields initially indicating that the corresponding element has not been scattered to the memory. In some embodiments there may be a one-to-one correspondence between active data fields in the mask register and data elements in the second register. For example, there may be just two, or four, or eight, or sixteen, etc. active data fields in a mask register of 32, or 64, or 128 potential data fields. A second value may indicate that the corresponding data element from the second register has been stored to memory and a first value may indicate that the corresponding element from the second register has not been stored in memory. Accordingly, in processing block 1742, the fields of the mask register are compared to the first value indicating that the corresponding element has not been scattered to the memory. If it is not equal to the first value, processing proceeds to processing block 1674 where the scattering operation reiterates until finished. Otherwise in processing block 1750 the effective address is accessed and the corresponding data element is written or scattered to the memory. It will again be appreciated that while the process 1701 is illustrated as being iterative and sequential, for example processing blocks 1726, 1734, 1742 and 1750, it may be preferable to perform multiple operations of processing blocks 1726, 1734, 1742 and 1750, in parallel when possible. Upon successful completion of processing block(s) 1750, the corresponding mask field or fields are changed in processing block 1766 to the second value indicating that the corresponding data element has already been scattered to the memory.

In processing block 1774, a determination is made whether the scattering operation is finished (i.e. each field of the plurality of mask fields in the mask register has the second value). If not processing reiterates starting in processing block 1726. Otherwise processing proceeds to processing block 1790 where the SIMD scatter instruction is retired and any changes to the mask register are made architecturally visible.

It will be appreciated that in the processes 1501, 1601 and/or 1701 to provide vector scatter functionality, storage is allocated in a register or a buffer (e.g. store data buffer 899) to hold the data elements (e.g. data 803) corresponding to addresses generated (e.g. effective address(es) 806) for storing the data elements to corresponding memory locations by a memory access unit (e.g. memory access unit 864). An FSM (e.g. FSM 892) changes the corresponding mask elements (e.g. of mask 802 in index array 888) upon successful completion of a corresponding store.

It will also be appreciated that in some embodiments, determinations may be made whether the data elements (e.g. data 803) stored in a store buffer (e.g. store data buffer 899) may eventually be used to satisfy newer load instructions out of sequential instruction order as early as the storage is allocated in the store buffer (e.g. store data buffer 899) corresponding to the addresses generated (e.g. effective address(es) 806). It will again be appreciated that by scheduling just a few micro-operations to transfer a set of indices (e.g. indices 801) from a SIMD vector register (e.g. of the vector physical registers 884) and a corresponding set of mask elements (e.g. mask 802 from the mask physical registers 882) to an index array (e.g. index array 888) and initialize finite state machine (e.g. FSM 892) to expand those few micro-operations to store the data (e.g. data 809) in parallel or concurrently with the execution of other instructions and responsive to, and/or in support of scatter operations, instruction throughput may be improved.

The above description is intended to illustrate preferred embodiments of the present invention. From the discussion above it should also be apparent that especially in such an area of technology, where growth is fast and further advancements are not easily foreseen, the invention may be modified in arrangement and detail by those skilled in the art without departing from the principles of the present invention within the scope of the accompanying claims and their equivalents.

What is claimed is:

1. A computer implemented method comprising:
responsive to a single decoded instruction:
copying from one or more registers a set of indices and a corresponding set of mask elements to an index array responsive to a first micro-operation generated by decoding a SIMD gather instruction;
generating a set of addresses from the set of indices in the index array for at least each corresponding mask element having a first value;
accessing an address from the set of addresses to load a corresponding data element if a corresponding mask element has said first value; and
initializing a finite state machine to expand a set of micro-operations to load and gather data concurrently with execution of other instructions, responsive to said SIMD gather instruction.

2. The computer implemented method of claim 1, wherein said initializing a finite state machine to expand said set of micro-operations to load and gather data concurrently with execution of other instructions, being performed responsive to the second micro-operation generated by decoding said SIMD gather instruction.

3. The computer implemented method of claim 2 further comprising:
writing the corresponding data element at an in-register position in a destination vector register according to a respective in-register position of an index, from the set of indices, corresponding to the accessed address from the set of addresses.

4. The computer implemented method of claim 3 further comprising: merging data elements at respective in-register positions in a temporary vector register according to respective in-register positions of indices, of the set of indices, corresponding to the respectively accessed addresses from the set of addresses.

5. The computer implemented method of claim 4 said merging being performed responsive to a third micro-operation of the set of micro-operations generated by decoding said SIMD gather instruction.

6. The computer implemented method of claim 2 further comprising:
changing the values of corresponding mask elements from the first value to a second value responsive to completion of their respective loads.

7. The computer implemented method of claim 6 said changing the values of corresponding mask elements from the first value to the second value responsive to completion of their respective loads being performed responsive to a third micro-operation of the set of micro-operations generated by decoding said SIMD gather instruction.

8. An apparatus comprising:
an index array;
a finite state machine (FSM) operatively coupled with the index array to store a set of indices from a first single instruction multiple data (SIMD) register and a corresponding set of mask elements to facilitate a SIMD gather operation;
an address generation logic to generate an address from an index of the set of indices in the index array for at least each corresponding mask element having a first value to access a first memory location corresponding to a first address generated to load a first data element;
a merge data logic, operatively coupled with a second SIMD register, to write the first data element at a first in-register position in the second SIMD register according to a respective in-register position in the first SIMD register of an index corresponding to said first address generated.

9. The apparatus of claim 8, wherein said merge data logic, is further to merge the plurality of data elements into the second SIMD register.

10. The apparatus of claim 8, further comprising: decode logic to decode said SIMD gather instruction and to generate a set of micro-operations responsive to decoding said SIMD gather instruction.

11. The apparatus of claim 10 said FSM to expand the set of micro-operations to load and gather data concurrently with execution of other instructions, responsive to said SIMD gather instruction.

12. The apparatus of claim 11 said FSM to change a value of a corresponding mask element from the first value to a second value upon completion of loading the first data element.

13. A processor comprising:
a first register comprising a plurality of mask elements, wherein the plurality of mask elements in the first register corresponds to a plurality of data elements accessible using a plurality of corresponding indices in a second register;

a decoder to decode a first instruction to generate a set of micro-operations; and one or more execution units including:

an index array to store a copy of the plurality of indices from the second register and the corresponding plurality of mask elements, and a finite state machine (FSM) operatively coupled with the index array to facilitate a gather operation using the plurality of indices and the corresponding mask elements, a merge data logic, operatively coupled with the memory access unit and with a third register, to write the first data element at a first in-register position in the third register according to a respective in-register position in the second register of an index corresponding to said first address generated.

14. The processor of claim 13, wherein for each mask element in the first register, a first value indicates the corresponding data element has not been accessed and a second value indicates that the corresponding data element does not need to be, or has already been accessed using a corresponding index from the second register.

15. The processor of claim 13, further comprising:

an address generation logic, responsive to the FSM, to generate an address from an index of the plurality of indices in the index array for at least each corresponding mask element having a first value.

16. The processor of claim 15, further comprising:

a memory access unit, operatively coupled with the address generation logic, to access a first memory location corresponding to a first address generated to load a first data element.

17. The processor of claim 16, wherein the FSM is to change a value of a corresponding mask element from the first value to a second value upon completion of loading the first data element.

* * * * *